United States Patent
Da et al.

(10) Patent No.: US 11,546,914 B2
(45) Date of Patent: Jan. 3, 2023

(54) SYSTEM INFORMATION CONFIGURATION METHOD AND DEVICE

(71) Applicant: CHINA ACADEMY OF TELECOMMUNICATIONS TECHNOLOGY, Beijing (CN)

(72) Inventors: Ren Da, Beijing (CN); Bin Ren, Beijing (CN); Zheng Zhao, Beijing (CN); FangChen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 175 days.

(21) Appl. No.: 16/961,217

(22) PCT Filed: Jan. 9, 2019

(86) PCT No.: PCT/CN2019/070963
§ 371 (c)(1),
(2) Date: Jul. 9, 2020

(87) PCT Pub. No.: WO2019/137389
PCT Pub. Date: Jul. 18, 2019

(65) Prior Publication Data
US 2021/0058931 A1    Feb. 25, 2021

(30) Foreign Application Priority Data
Jan. 12, 2018  (CN) .................. 201810032494.X

(51) Int. Cl.
*H04W 72/04* (2009.01)
*H04W 56/00* (2009.01)
*H04L 5/00* (2006.01)

(52) U.S. Cl.
CPC ....... *H04W 72/0493* (2013.01); *H04L 5/0094* (2013.01); *H04W 56/001* (2013.01); *H04W 72/0453* (2013.01)

(58) Field of Classification Search
None
See application file for complete search history.

(56) References Cited

U.S. PATENT DOCUMENTS

| 2018/0367277 A1 | 12/2018 | Zhang et al. |
| 2019/0045553 A1 | 2/2019 | Zhang et al. |

(Continued)

FOREIGN PATENT DOCUMENTS

| CN | 107046721 A | 8/2017 |
| CN | 108282877 A | 7/2018 |

OTHER PUBLICATIONS

"Summary of Offline Discussion on Remaining Minimum System Information", R1-171688, 3GPP TSG RAN WG1 Meeting 91, Reno, USA, Nov. 27-Dec. 1, 2017.

(Continued)

*Primary Examiner* — Saba Tsegaye
(74) *Attorney, Agent, or Firm* — Ladas & Parry, LLP

(57) ABSTRACT

A system information configuration method and device are provided, related to the field of communications. The method includes: determining, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and performing a frequency offset configuration of the (Continued)

RMSI CORESET with respect to the SSB according to the frequency offset configuration parameter.

18 Claims, 5 Drawing Sheets

(56) References Cited

U.S. PATENT DOCUMENTS

| | | | | |
|---|---|---|---|---|
| 2019/0150121 A1* | 5/2019 | Abdoli | ................ | H04L 5/0053 370/329 |
| 2019/0159226 A1* | 5/2019 | Ly | ..................... | H04L 5/0048 |
| 2021/0176755 A1* | 6/2021 | Liu | ................... | H04L 27/2602 |

OTHER PUBLICATIONS

"RMSI delivery and CORESET configuration", R1-1719894, 3GPP TSG RAN WG1 Meeting 91, Reno, USA, Nov. 27-Dec. 1, 2017.
"On Remaining details on RMSI", R1-1720170, 3GPP TSG RAN WG1 Meeting 91, Reno, USA, Nov. 27-Dec. 1, 2017.
"Summary on Frequency Offset Indication for TDM Scenario where SS BW and RMSI BW are Confined within Minimum Carrier Bandwidth", R1-1721532, 3GPP TSG RAN WG1 Meeting 91, Reno, USA, Nov. 27-Dec. 1, 2017.
Extended European Search Report from EP app. No. 19738542.0, dated Jan. 28, 2021.
International search report from PCT/CN2019/070963, dated Apr. 9, 2019, with English translation from WIPO.
Written Opinion of the International Searching Authority from PCT/CN2019/070963, dated Apr. 9, 2019, with English translation from WIPO.
International Preliminary Report on Patentability from PCT/CN2019/070963, dated Jul. 14, 2020, with English translation from WIPO.
First Office Action from TW app. No. 108101131, dated Nov. 11, 2020, with Machine English translation.
"RMSI Delivery", R1-1710029, 3GPP TSG RAN WG1 NR Ad-Hoc#2, Qingdao, P.R.China, Jun. 27-30, 2017.
"Remaining details of RMSI", R1-1719342, 3GPP TSG RAN WG1 Meeting #91, Reno, USA, Nov. 27-Dec. 1, 2017.
"Remaining details on Remaining minimum system information", R1-1719622, 3GPP TSG RAN WG1 Meeting #91, Reno, USA, Nov. 27-Dec. 1, 2017.
"On Remaining Issues on RMSI", R1-18800229, 3GPP TSG RAN WG1 Meeting AH 1801, Vancouver, Canada, Jan. 22-26, 2018.
"Remaining details related to SS blocks", R1-1721361, 3GPP TSG RAN WG1 Meeting #91, Reno, USA, Nov. 27-Dec. 1, 2017.
Fourth Office Action for European Patent Application 19738542.0 dated May 23, 2022.
"Remaining Details on RMSI" 3GPP TSG RAN WG1#91, R1-1720274, Reno, USA, Nov. 27-Dec. 1, 2017, Agenda Item: 7.1.2.2, Source: Samsung, all pages.
"Summary on Frequency Offset Indication for TDM Scenario where SS BW and RMSI BW are Confined within UE Minimum Bandwidth" 3GPP TSG RAN WG1#91, R1-1721629, Reno, USA, Nov. 27-Dec. 1, 2017, Agenda Item: 7.1.2.2, all pages.

* cited by examiner

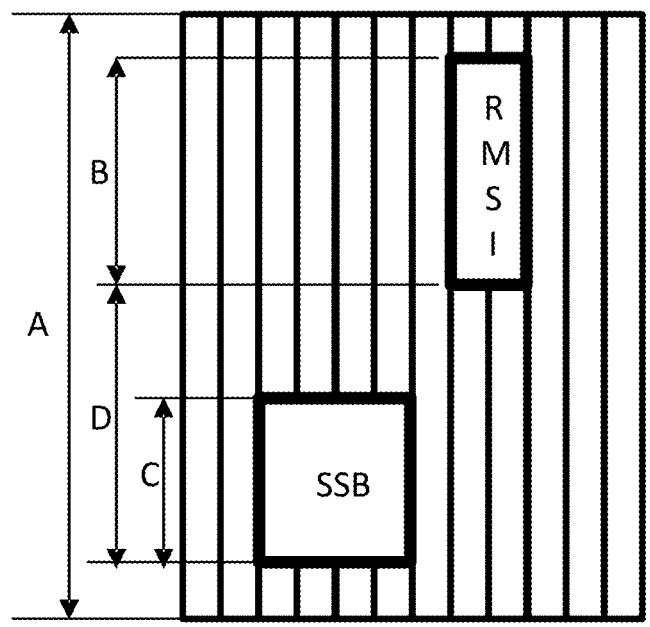

FIG. 1 determining, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter ⁓ 21 performing a frequency offset configuration of the RMSI CORESET with respect to the SSB according to the frequency offset configuration parameter ⁓ 22

FIG. 2

SYSTEM INFORMATION CONFIGURATION METHOD AND DEVICE

CROSS REFERENCE TO RELATED APPLICATIONS

The present application is the U.S. national phase of PCT Application No. PCT/CN2019/070963 filed on Jan. 9, 2019, which claims a priority to Chinese patent application No. 201810032494.X filed on Jan. 12, 2018, the disclosures of which are incorporated herein by reference in their entireties.

The present application claims a priority of Chinese patent application No. 201810032494.X filed on Jan. 12, 2018, which is incorporated herein by reference in its entirety.

TECHNICAL FIELD

The present disclosure relates to the field of communications, and more particularly, to a system information configuration method and device.

BACKGROUND

In the 5G NR (New Radio) system, the minimum system information (MSI, Minimum System Information) is the system information necessary for the terminal to make the initial access. A part of the minimum system information is transmitted through PBCH (Physical Broadcast Channel, Physical Broadcast Channel), and the remaining minimum system information (RMSI, Remaining Minimum System Information) is transmitted through PDSCH (Physical Downlink Shared Channel, Physical Downlink Shared Channel). In addition, the PDSCH transmitting the RMSI is scheduled by using a PDCCH (Physical Downlink Control Channel, physical downlink control channel). The PDCCH (PDSCH used to schedule the bearer RMSI) is indicated by RMSI control resource set (CORESET, Control Resource Set) configuration information. The RMSI CORESET configuration information belongs to the minimum system information and is transmitted on the PBCH channel.

Each RMSI CORESET is associated with a system synchronization block (SSB, System Synchronization Block). The RMSI CORESET and the SSB have two multiplexing modes, frequency division multiplexing (FDM, Frequency Division Multiplexing) or time division multiplexing (TDM, Time Division Multiplexing), respectively. Here, the time division multiplexing means that the RMSI CORESET and the associated SSB are transmitted on different OFDM (Orthogonal Frequency Division Multiplexing) symbols in the time domain. The time division multiplexing mode must be supported when the system cannot support the frequency division multiplexing mode.

NR supports different multiplexing modes between SSB and RMSI CORESET. The time division multiplexing mode is also referred to as "Mode 1"; [1, and 2] refers to a multiplexing mode in which SSB and RMSI CORESET occur at different times. For time division multiplexing "Mode 1", the time division multiplexing manner of the RMSI CORESET and the associated SSB is shown in FIG. 1, where "A" is the carrier bandwidth and has a granularity of RMSI RB (Resource Block); "B" is the bandwidth occupied by the RMSI CORESET at a granularity of RMSI RB; "C" is the bandwidth occupied by the SSB at a granularity of SSB RB; "D" is a frequency domain offset indication of RMSI CORESET relative to SSB, with a granularity of RMSI RB. The carrier bandwidth used in designing frequency offset settings for a radio frequency band will be greater than or equal to the minimum bandwidth specified for that radio frequency band. Each RMSI RB and SSB RB uses a bandwidth equal to 12 times the bandwidth of their respective SCS. For example, when SCS=15 kHz, one RB uses a bandwidth of 180 kHz. The SCS of the RMSI may be the same as or different from the SCS of the associated SSB.

A key point in the RMSI CORESET configuration design is how to configure the frequency offset between the RMSI CORESET and the associated SSB, i.e. how to configure the difference between the minimum RB index of the SSB and the minimum RB index of the RMSI CORESET, corresponding to parameter D in FIG. 1.

In the 3GPP RAN1 #91 meeting, it has been determined that the following combinations of SSB SCS and RMSI CORSET SCS are supported:
  combinations under 6 GHz include: {SS SCS, RMSI SCS}={15,15} kHz, {15,30} kHz, {30,15} kHz, {30,30} kHz;
  combinations above 6 GHz include: {SS SCS, RMSI SCS}={120, 60} kHz, {120,120} kHz, {240, 60} kHz, {240,120} kHz.

For any combination of SSB subcarrier spacing (SCS, Subcarrier Spacing) and RMSI CORESET SCS, it is desirable to support as many RMSI CORESET configurations as possible from a system design point of view. However, the NR protocol specifies that only 4 bits in the PBCH can be used to indicate the frequency offset between the start position of the RMSI CORESET and the start position of the associated SSB, i.e. a total of only $2^4=16$ cases can be indicated.

Tables 13-1 to 13-8 in 3GPP protocol standard TS 38.213 [2] have given the frequency offset configuration between the RMSI CORESET and the associated SSB supporting the combination of SSB SCS and RMSI CORSET SCS above.

However, due to the limitation of meeting time in the related art, the consideration of the frequency offset configuration for RMSI CORESET with respect to SSB in Tables 13-1 to 13-8 in TS38.213 [2] is not comprehensive. In particular, the effects of factors such as a SS Raster and a minimum channel bandwidth are not considered for 6 GHz or less.

SUMMARY

A technical issue to be solved by the present disclosure is to provide a configuring system information method and device, so as to solve an issue in the related art that the frequency offset configuration of a RMSI CORESET with respect to an SSB is not fully considered.

A system information configuration method is provided in the present disclosure, including:
  determining, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and
  performing a frequency offset configuration of the RMSI CORESET with respect to the SSB according to the frequency offset configuration parameter.

Optionally, the determining based on the target parameter which is predetermined the frequency offset configuration parameter of the RMSI CORESET with respect to the SSB includes:

determining, based on the target parameters corresponding to carrier frequency bands in different frequency ranges, the frequency offset configuration parameters of the carrier frequency bands in different frequency ranges;

performing the frequency offset configuration of the RMSI CORESET with respect to the SSB according to the frequency offset configuration parameter includes:

performing the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Optionally, the determining based on the target parameters corresponding to the carrier frequency bands in different frequency ranges the frequency offset configuration parameters of the carrier frequency bands in different frequency ranges includes:

determining the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

Optionally, the carrier frequency bands in different frequency ranges include a carrier frequency band in a frequency range of 0 to 2.65 GHz and/or a carrier frequency band in a frequency range of 2.4 GHz to 6 GHz;

a minimum channel bandwidth of the carrier frequency band in the frequency range of 0 to 2.65 GHz includes 5 MHz, 10 MHz and/or 20 MHz;

a minimum channel bandwidth of the carrier frequency band in the frequency range of 2.4 GHz to 6 GHz includes 10 MHz, 20 MHz, and/or 40 MHz.

Optionally, the minimum channel bandwidth of the carrier frequency band in the frequency range of 0 to 2.65 GHz includes 5 MHz and 10 MHz, and the same frequency offset configuration table at the minimum channel bandwidths of 5 MHz and 10 MHz is used for the carrier frequency bands in the frequency range of 0 to 2.65 GHz.

Optionally, the frequency offset configuration parameter includes a candidate frequency offset quantity and a frequency offset;

the determining, based on the target parameter which is predetermined, the frequency offset configuration parameter of the RMSI CORESET with respect to the SSB includes:

determining the candidate frequency offset quantity and the frequency offset based on the target parameter which is predetermined and a predetermined rule;

where the predetermined rule includes one or more of a rule of minimizing all possible quantities of candidate frequency offset positions within one SS Raster interval and a rule of aligning the SSB with a center of the RMSI CORESET.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval;

the determining the candidate frequency offset quantity and the frequency offset based on the target parameter which is predetermined and the predetermined rule includes:

determining, based on the quantity of RBs within the channel bandwidth and the quantity of RBs within the RMSI CORESET bandwidth, a maximum quantity of positions of the SSB supportable by each offset value in a configuration;

determining, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

determining the candidate frequency offset quantity, based on the maximum quantity of RB positions possible for placing SS Rasters in the channel bandwidth and the maximum quantity of positions of the SSB supportable by each offset value in the configuration; and determining a candidate set of frequency offsets, based on the candidate frequency offset quantity, the maximum quantity of positions of the SSB supportable by each offset value in the configuration and a predefined initial offset.

Optionally, the determining, based on the quantity of RBs within the channel bandwidth and the quantity of RBs within the RMSI CORESET bandwidth, the maximum quantity of positions of the SSB supportable by each offset value in the configuration includes:

determining the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$\Delta_{SSB} = \text{floor}([N_{BW} - N_{RMSI}] + 1] * 2^{-\mu});$$

where $\mu$ is a scaling factor between the SCS of the SSB and the SCS of the RMSI, and floor represents a rounding down function.

Optionally, the determining, based on the SS Raster interval and the maximum quantity of RB positions possible for placing SS Rasters in the channel bandwidth and according to the rule of minimizing all possible quantities of candidate frequency offset positions within one SS Raster interval, the maximum quantity of candidate RB positions possible for placing the SS Rasters in the channel bandwidth includes:

determining the maximum quantity N' of RB positions possible for placing the SS Rasters in the channel bandwidth, based on the quantity $N_{SSB}$ of RBs in a granularity of SSB RB within the channel bandwidth and through the following formula:

$$N' = N_{SSB} - 19;$$

determining the maximum quantity N of candidate RB positions possible for placing the SS Rasters in the channel bandwidth, based on the SS Raster interval $N_{Sync}$ in a granularity of SSB RB and N' and through the following formula:

$$N = \min(N_{Sync}, N');$$

where min represents a minimum value finding function.

Optionally, the determining the candidate frequency offset quantity, based on the maximum quantity of RB positions possible for placing SS Rasters in the channel bandwidth and the maximum quantity of positions of the SSB supportable by each offset value in the configuration includes:

determining the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

where ceiling represents an rounding up function.

Optionally, the determining the candidate set of frequency offsets, based on the candidate frequency offset quantity, the maximum quantity of positions of the SSB supportable by each offset value in the configuration and the predefined initial offset includes:

determining a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^{\mu}, & \text{if } \Delta_{SSB} \leq (N_{RMSI} * 2^{-\mu} - 20) \\ N_{RMSI} - 20 * 2^{\mu}, & \text{if } \Delta_{SSB} > (N_{RMSI} * 2^{-\mu} - 20) \end{cases};$$

where $\mu$ is a scaling factor between the SCS of the SSB and the SCS of the RMSI; $N_{RMSI}$ is the quantity of RBs in a granularity of RMSI RB in the RMSI CORESET bandwidth;

determining a value of an $i^{th}$ frequency offset $O_i$ in the candidate set of frequency offsets, based on the candidate frequency offset quantity P, the frequency offset step size $\Delta_{RMSI}$ and the predefined initial offset $O_0$ and through the following formula:

$$O_i = O_0 + (i-1) * \Delta_{RMSI};$$

where $1 \leq i \leq P$.

Optionally, prior to the determining the value of the $i^{th}$ frequency offset $O_i$ in the candidate set of frequency offsets, based on the candidate frequency offset quantity P, the frequency offset step size $\Delta_{RMSI}$ and the predefined initial offset $O_0$, the method further includes:

determining the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

Optionally, the determining the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET includes:

determining the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula:

$$O_0 = \text{floor}\left(\frac{N_{RMSI} - 20 * 2^{\mu} - (P-1)\Delta_{RMSI}}{2}\right).$$

A system information configuration device is further provided in the present disclosure, including:

a determining module, configured to determine, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and a configuring module, configured to perform a frequency offset configuration of the RMSI CORESET with respect to the SSB according to the frequency offset configuration parameter.

A system information configuration device is further provided in the present disclosure, including a transceiver, a memory, a processor and a computer program stored in the memory and executable on the processor;

the processor is configured to read a program in the memory to:

determine, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and perform a frequency offset configuration of the RMSI CORESET with respect to the SSB according to the frequency offset configuration parameter.

Optionally, the processor is configured to read the program in the memory to:

determine, based on the target parameters corresponding to carrier frequency bands in different frequency ranges, the frequency offset configuration parameters of the carrier frequency bands in different frequency ranges;

perform the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Optionally, the processor is configured to read the program in the memory to:

determine the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

Optionally, the carrier frequency bands in different frequency ranges include a carrier frequency band in a frequency range of 0 to 2.65 GHz and/or a carrier frequency band in a frequency range of 2.4 GHz to 6 GHz;

a minimum channel bandwidth of the carrier frequency band in the frequency range of 0 to 2.65 GHz includes 5 MHz, 10 MHz and/or 20 MHz;

a minimum channel bandwidth of the carrier frequency band in the frequency range of 2.4 GHz to 6 GHz includes 10 MHz, 20 MHz, and/or 40 MHz.

Optionally, the minimum channel bandwidth of the carrier frequency band in the frequency range of 0 to 2.65 GHz includes 5 MHz and 10 MHz, and the same frequency offset configuration table at the minimum channel bandwidths of 5 MHz and 10 MHz is used for the carrier frequency bands in the frequency range of 0 to 2.65 GHz.

Optionally, the frequency offset configuration parameter includes a candidate frequency offset quantity and a frequency offset;

the processor is configured to read the program in the memory to:

determine the candidate frequency offset quantity and the frequency offset based on the target parameter which is predetermined and a predetermined rule;

where the predetermined rule includes one or more of a rule of minimizing all possible quantities of candidate frequency offset positions within one SS Raster interval and a rule of aligning the SSB with a center of the RMSI CORESET.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval;

the processor is configured to read the program in the memory to:

determine, based on the quantity of RBs within the channel bandwidth and the quantity of RBs within the RMSI CORESET bandwidth, a maximum quantity of positions of the SSB supportable by each offset value in a configuration;

determine, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

determine the candidate frequency offset quantity, based on the maximum quantity of RB positions possible for placing SS Rasters in the channel bandwidth and the maximum quantity of positions of the SSB supportable by each offset value in the configuration; and determine a candidate set of frequency offsets, based on the candidate frequency offset quantity, the maximum quantity of positions of the SSB supportable by each offset value in the configuration and a predefined initial offset.

Optionally, the processor is configured to read the program in the memory to:

determine the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$\Delta_{SSB} = \text{floor}([(N_{BW} - N_{RMSI}) + 1] * 2^{-\mu})$;

where $\mu$ is a scaling factor between the SCS of the SSB and the SCS of the RMSI, and floor represents a rounding down function.

Optionally, the processor is configured to read the program in the memory to:

determine the maximum quantity N' of RB positions possible for placing the SS Rasters in the channel bandwidth, based on the quantity $N_{SSB}$ of RBs in a granularity of SSB RB within the channel bandwidth and through the following formula:

$N' = N_{SSB} - 19$;

determine the maximum quantity N of candidate RB positions possible for placing the SS Rasters in the channel bandwidth, based on the SS Raster interval $N_{Sync}$ in a granularity of SSB RB and N' and through the following formula:

$N = \min(N_{Sync}, N')$;

where min represents a minimum value finding function.

Optionally, the processor is configured to read the program in the memory to:

determine the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

where ceiling represents an rounding up function.

Optionally, the processor is configured to read the program in the memory to:

determine a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^\mu, & \text{if } \Delta_{SSB} \leq (N_{RMSI} * 2^{-\mu} - 20) \\ N_{RMSI} - 20 * 2^\mu, & \text{if } \Delta_{SSB} > (N_{RMSI} * 2^{-\mu} - 20) \end{cases};$$

where $\mu$ is a scaling factor between the SCS of the SSB and the SCS of the RMSI; $N_{RMSI}$ is the quantity of RBs in a granularity of RMSI RB in the RMSI CORESET bandwidth;

determine a value of an $i^{th}$ frequency offset $O_i$ in the candidate set of frequency offsets, based on the candidate frequency offset quantity P, the frequency offset step size $\Delta_{RMSI}$ and the predefined initial offset $O_0$ and through the following formula:

$O_i = O_0 + (i-1) * \Delta_{RMSI}$;

where $1 \leq i \leq P$.

Optionally, the processor is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

Optionally, the processor is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula:

$$O_0 = \text{floor}\left(\frac{N_{RMSI} - 20 * 2^\mu - (P-1)\Delta_{RMSI}}{2}\right).$$

A computer readable storage medium is further provided in the present disclosure, where a computer program is stored in the computer readable storage medium, the computer program is executed by a processor to perform the system information configuration method hereinabove.

Advantageous effects of the above technical solution of the present disclosure are as follows:

According to the system information configuration method according to the present disclosure, a frequency offset configuration parameter of the RMSI CORESET with respect to the SSB is first determined based on a predetermined target parameter; The target parameters include one or more of channel bandwidth parameters, SCS parameters of RMSI, SCS parameters of SSB, SS Raster parameters, and RMSI CORESET bandwidth parameters; the frequency offset configuration of the RMSI CORESET with respect to the SSB is then performed according to the frequency offset configuration parameters. In this way, the frequency offset configuration of the RMSI CORESET with respect to the SSB is performed by combining factors such as the combination of the RMSI SCS and the SSB SCS, the channel bandwidth, the SS Raster, and the RMSI CORESET bandwidth. In consideration, the protocol configuration method is improved, the correctness of the protocol configuration is ensured, and the problem that the frequency offset configuration in the related art is not considered comprehensively is solved.

BRIEF DESCRIPTION OF THE DRAWINGS

FIG. 1 is a schematic view of a RMSI CORESET and SSB time division multiplexing mode;

FIG. 2 is a flowchart of a system information configuration method in some embodiments of the present disclosure;

DETAILED DESCRIPTION

Figure 3:
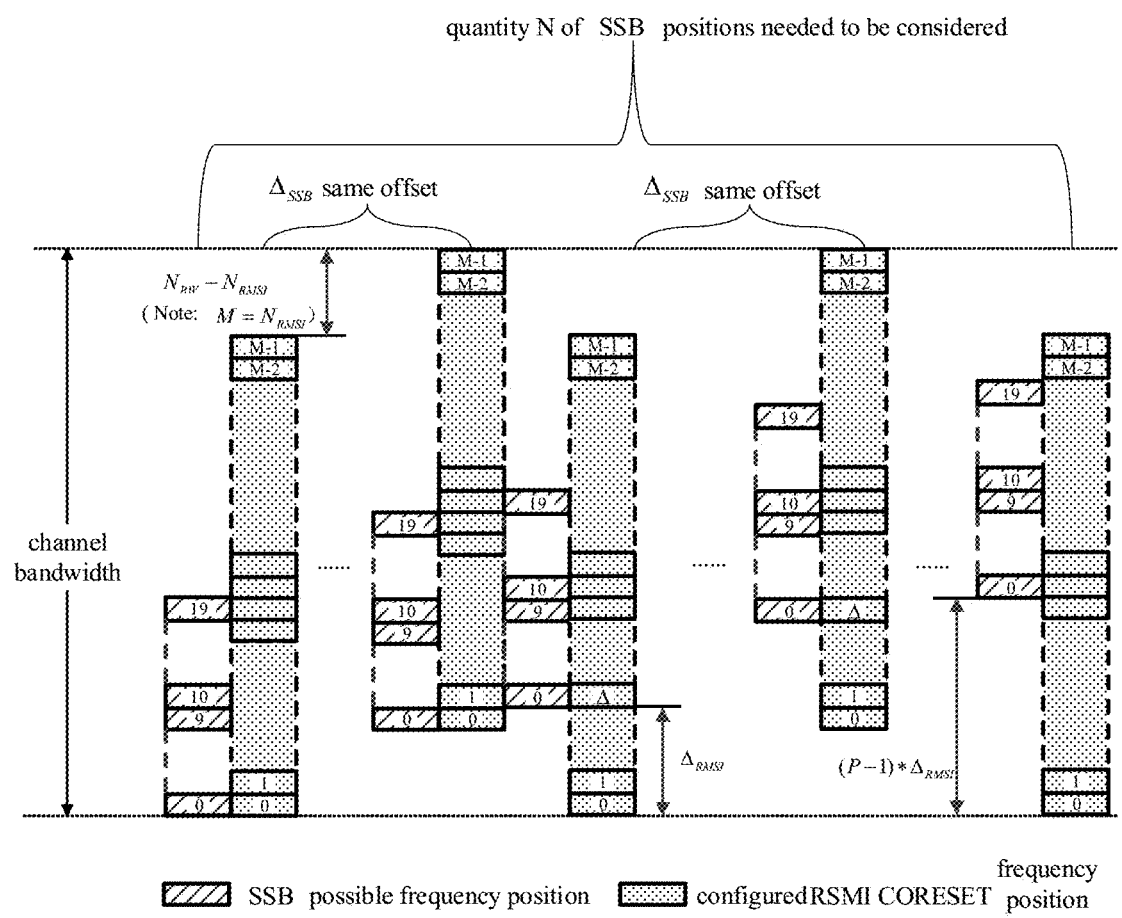
FIG. 3 is a schematic view of a frequency offset configuration of a system information configuration method in some embodiments of the present disclosure.

In order that the technical problems, technical solutions, and advantages to be solved by the present disclosure may be made clearer, reference will now be made in detail to the accompanying drawings and specific examples.

In some embodiments of the present disclosure, a system information configuration method is provided with reference to FIG. 2, including:

Step 21: determining, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter;

Step 22: performing a frequency offset configuration of the RMSI CORESET with respect to the SSB according to the frequency offset configuration parameter.

According to the system information configuration method in some embodiments of the present disclosure, the frequency offset configuration of the RMSI CORESET with respect to the SSB is performed by combining factors such as RMSI SCS and SSB SCS combination, channel bandwidth, SS Raster, and RMSI CORESET bandwidth. In consideration of the above, the protocol configuration method is improved, and correctness of the protocol configuration is ensured.

In some embodiments of the present disclosure, only RMSI CORESET is referred to, and if not specifically described RMSI all refer to RMSI CORESET.

Optionally, the step 21 includes:

Step 211: determining, based on the target parameters corresponding to carrier frequency bands in different frequency ranges, the frequency offset configuration parameters of the carrier frequency bands in different frequency ranges.

Here, the frequency offset configuration parameters of the carrier frequency bands of the different frequency ranges are determined according to the target parameters corresponding to the carrier frequency bands of the different frequency ranges, so that a frequency offset configuration is performed independently on each of the carrier frequency bands of the different frequency ranges.

Step 22 includes:

Step 222: performing the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Here, according to the frequency offset configuration parameters of the carrier frequency bands in the different frequency ranges, the frequency offset configuration is separately performed on the carrier frequency bands in the different frequency ranges, and a frequency offset configuration table corresponding to the carrier frequency bands in the different frequency ranges is obtained.

The carrier frequency bands of the different frequency ranges may include, but are not limited to, a carrier frequency band in a frequency range of 0 to 2.65 GHz and/or a carrier frequency band in a frequency range of 2.4 GHz to 6 GHz, for example.

At this time, by the above steps 211 and 222, it is possible to obtain a separate frequency offset configuration table for each of the carrier frequency band in the [0-2.65 GHz] frequency range and the carrier frequency band in the [2.4 GHz-6 GHz] frequency range.

Since the TS 38.213 table 13-1 is almost full in the current design and cannot support the frequency offsets required for the [2.4-6 GHz] frequency range by adding more configurations, this problem is avoided by using a separate RMSI CORESET frequency offset configuration table for the frequency ranges of [0, 2.65 GHz], and [2.4-6 GHz] in the present disclosure. For the frequency range of [2.4-6 GHz], a frequency band in which the current minimum channel bandwidth is 10 MHz, that is, a frequency offset configuration of 5 MHz bandwidth, is not required. In the present disclosure, by using a separate RMSI CORESET frequency offset configuration table for the frequency ranges of [0, 2.65

GHz], and [2.4-6 GHz], more space can be provided for the frequency range of [2.4-6 GHz] to handle the problem of excessive offsets.

Optionally, step 211 includes:

Step 2111: determining the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

In this case, the SS Raster definition in different carrier frequency bands, the combination of different RMSI SCS and SSB SCS, and the conditions of different minimum channel bandwidths are considered, and the frequency offset configuration parameters are determined by using the target parameters corresponding to the carrier frequency bands in different frequency ranges under these conditions, and then the RMSI CORESET frequency offset configuration is performed based on the frequency offset configuration parameters, so that all the RMSI CORESET frequency offset configurations are realized. In addition, the protocol configuration method is improved, and the correctness of the protocol configuration is ensured.

where the carrier frequency bands of the different frequency ranges include a carrier frequency band in a frequency range of 0 to 2.65 GHz and/or a carrier frequency band in a frequency range of 2.4 GHz to 6 GHz; The minimum channel bandwidth of the carrier frequency band ranging from 0 to 2.65 GHz includes 5 MHz, 10 MHz and/or 20 MHz; The minimum channel bandwidth of the carrier frequency band ranging from 2.4 GHz to 6 GHz includes 10 MHz, 20 MHz, and/or 40 MHz.

In this case, the frequency offset configuration parameters of the carrier frequency band of the [0-2.65 GHz] can be obtained based on the target parameters corresponding to the carrier frequency band of the [0-2.65 GHz] at the minimum channel bandwidths of 5 MHz, 10 MHz, and 20 MHz, and the SS Raster definitions in different carrier frequency bands, and different combinations of RMSI SCS and SSB SCS, respectively, so that the offset configuration table of the carrier frequency band of the [0-2.65 GHz] can be obtained. Meanwhile, the frequency offset configuration parameters of the carrier frequency band of the [2.4 GHz-6 GHz] can be obtained according to the target parameters corresponding to the carrier frequency band of the [2.4 GHz-6 GHz] in the minimum channel bandwidths of 10 MHz, 20 MHz, and 40 MHz, and the SS Raster definitions in different carrier frequency bands, and different combinations of RMSI SCS and SSB SCS, respectively, and the offset configuration table of the carrier frequency band of the [2.4 GHz-6 GHz] can be further obtained.

In particular, some embodiments of the present disclosure add a frequency offset configuration table for a frequency range of [2.4, 6 GHz] and a minimum channel bandwidth of 40 MHz bands.

Optionally, the minimum channel bandwidth of the carrier frequency band in a frequency range of 0 to 2.65 GHz includes 5 MHz and 10 MHz, and the carrier frequency band in a frequency range of 0 to 2.65 GHz uses the same frequency offset configuration table at the minimum channel bandwidths of 5 MHz and 10 MHz.

At this time, in the frequency range of [0-2.65 GHz], the same frequency offset configuration table can be used at the minimum channel bandwidths of 5 MHz and 10 MHz by a reasonable design.

A method according to determining a frequency offset configuration parameter in some embodiments of the present disclosure is described in detail below.

Optionally, the frequency offset configuration parameter includes a quantity of candidate frequency offsets and a frequency offset. Step 21 includes:

Step 212, determining the candidate frequency offset quantity and the frequency offset based on the target parameter which is predetermined and a predetermined rule, where the predetermined rule includes one or more of a rule of minimizing all possible quantities of candidate frequency offset positions within one SS Raster interval and a rule of aligning the SSB with a center of the RMSI CORESET.

In some embodiments of the present disclosure, for a given carrier frequency band corresponding to SS Raster, channel bandwidth, SCS of RMSI, SCS of SSB, and RMSI CORESET bandwidth, when all RMSI CORESET configurations are designed based on the rule of minimizing all possible quantities of candidate frequency offset positions within an SS Raster interval, the configuration method is simplified, and efficiency is improved. When all RMSI CORESET configurations are designed based on the rule of aligning the SSB with the frequency domain position center of the RMSI CORESET, it is possible to ensure that the frequency domain channel responses of the RMSI CORESET and the SSB are substantially equal when the bandwidth of the RMSI CORESET is large, so as to ensure a frequency domain QCL (Quasi-colposition) relationship.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval. Step 212 includes step 2121-2124:

Step 2121: determining, based on the quantity of RBs within the channel bandwidth and the quantity of RBs within the RMSI CORESET bandwidth, a maximum quantity of positions of the SSB supportable by each offset value in a configuration.

Specifically, the step 2121 includes:

determining the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$\Delta_{SSB} = \text{floor}([(N_{BW} - N_{RMSI}) + 1] * 2^{-\mu});$$

where $\mu$ is a scaling factor between the SCS ($SCS_{SSB}$) of the SSB and the SCS ($SCS_{RMSI}$) of the RMSI. That is, $SCS_{SSB} = 2^{\mu} * SCS_{RMSI}$, and $\mu$ may be $-1, 0, 1, 2$, but are not limited thereto, floor represents a rounding down function.

Step 2122: determining, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth.

Here, the maximum quantity of candidate RB positions at which the SS Raster may be placed in the channel bandwidth to be considered corresponds to the number N of possible SSB positions at which the SS Raster may be placed in the channel bandwidth to be considered. N depends on the following two values: A) SS Raster interval; B) Maximum number of RB positions within the channel bandwidth where SS Raster may be placed.

Specifically, the step 2122 includes:

Step 21221: determining the maximum quantity N' of RB positions possible for placing the SS Rasters in the channel bandwidth, based on the quantity $N_{SSB}$ of RBs in a granularity of SSB RB within the channel bandwidth and through the following formula:

$$N'=N_{SSB}-19$$

Step 21222: determining the maximum quantity N of candidate RB positions possible for placing the SS Rasters in the channel bandwidth, based on the SS Raster interval $N_{Sync}$ in a granularity of SSB RB and N' and through the following formula:

$$N=\min(N_{Sync},N');$$

where min represents a minimum value finding function.

Here, if the SS Raster interval is smaller than, it is possible to place a plurality of SS Raster in the carrier bandwidth. However, from the RMSI CORESET frequency offset configuration design, it is required to use a minimum number of frequency offsets, that is, a rule of minimizing all possible quantities of candidate frequency offset positions within one SS Raster interval. Therefore, it is necessary to consider only the quantity of RB positions in which it is possible to place one SS Raster within its period, that is, $N_{Sync}, N'$ $N=\min(N_{Sync}, N')$.

Step 2123: determining the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

where ceiling represents an rounding up function.

Here, the quantity P of subsequent frequency offsets required for the RMSI CORESET configuration is equal to the maximum quantity N of candidate RB positions within the channel bandwidth where SS Raster may be placed, divided by the maximum quantity of positions $\Delta_{SSB}$ where each offset value in the previous configuration may support SSB, and then rounded up.

Step 2124: determining a candidate set of frequency offsets, based on the candidate frequency offset quantity, the maximum quantity of positions of the SSB supportable by each offset value in the configuration and a predefined initial offset.

Specifically, the step 2124 includes:

determining a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^{\mu}, & \text{if } \Delta_{SSB} \leq (N_{RMSI} * 2^{-\mu} - 20) \\ N_{RMSI} - 20 * 2^{\mu}, & \text{if } \Delta_{SSB} > (N_{RMSI} * 2^{-\mu} - 20) \end{cases};$$

where μ is a scaling factor between the SCS of the SSB and the SCS of the RMSI; $N_{RMSI}$ is the quantity of RBs in a granularity of RMSI RB in the RMSI CORESET bandwidth.

Here, the frequency offset step size $\Delta_{RMSI}$ is calculated from the scaling factor between the SCS of the SSB and the SCS of the RMSI, and the value of $\Delta_{RMSI}$ uses RMSI RB as the granularity. Since the granularity size is SSB RB, SSB is multiplied by $2^{\mu}$ to be converted to $\Delta_{RMSI}$. In addition, the maximum frequency offset should be smaller than the difference between the RMSI CORESET bandwidth and the SSB bandwidth, so that:

$$\Delta_{RMSI} = \begin{cases} \Delta_{SSB} * 2^{\mu}, & \text{if } \Delta_{SSB} \leq (N_{RMSI} * 2^{-\mu} - 20) \\ N_{RMSI} - 20 * 2^{\mu}, & \text{if } \Delta_{SSB} > (N_{RMSI} * 2^{-\mu} - 20) \end{cases}.$$

Step 21242: determining a value of an $i^{th}$ frequency offset $O_i$ in the candidate set of frequency offsets, based on the candidate frequency offset quantity P, the frequency offset step size $\Delta_{RMSI}$ and the predefined initial offset $O_0$ and through the following formula:

$$O_i = O_0 + (i-1) * \Delta_{RMSI};$$

where $1 \leq i \leq P$.

Finally, a candidate set of frequency offsets can be obtained: O $$O = \{O_0, O_1, L, O_{p-1}\} = \{O_0, O_0 + \Delta_{RMSI}, L, O_0 + (i-1) * \Delta_{RMSI}, L, O_0 + (p-1) * \Delta_{RMSI}\}.$$

where the choice of $O_0$ is not unique. This means, for example, $O_0 = 0$ means that SSB and RMSI CORESET start with bottom alignment. In general, the SSB and RMSI CORESET should be designed to meet the as central alignment rule as possible so as to ensure that the frequency-domain channel responses of the RMSI and the SSB are substantially equal when the bandwidth of the RMSI is large, to ensure the frequency-domain QCL relationship.

Optionally, before step 21242, the method further comprises:

Step 23: determining the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

In this case, the initial offset $O_0$ is determined based on the rule of alignment of the SSB and the center of the RMSI CORESET. When the bandwidth of the RMSI CORESET is large, it is possible to ensure that the frequency-domain channel responses of the RMSI CORESET and the SSB are substantially equal, so as to ensure the frequency-domain QCL relationship.

Specifically, the step 23 includes:

Step 231: determining the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula $$O_0 = \text{floor}\left(\frac{N_{RMSI} - 20 * 2^{\mu} - (P-1)\Delta_{RMSI}}{2}\right).$$

Figure 4:
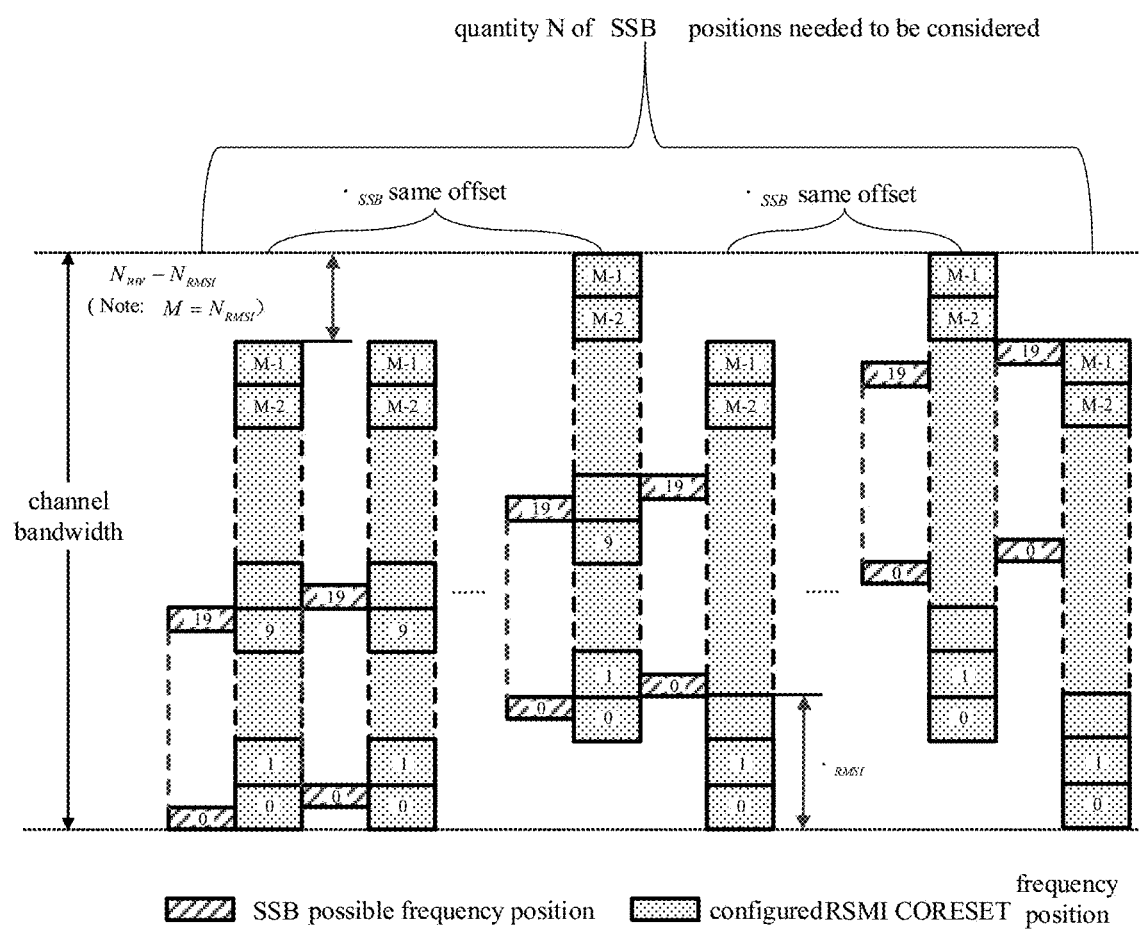
FIG. 4 is a schematic view of another frequency offset configuration of a system information configuration method in some embodiments of the present disclosure.
Figure 5:
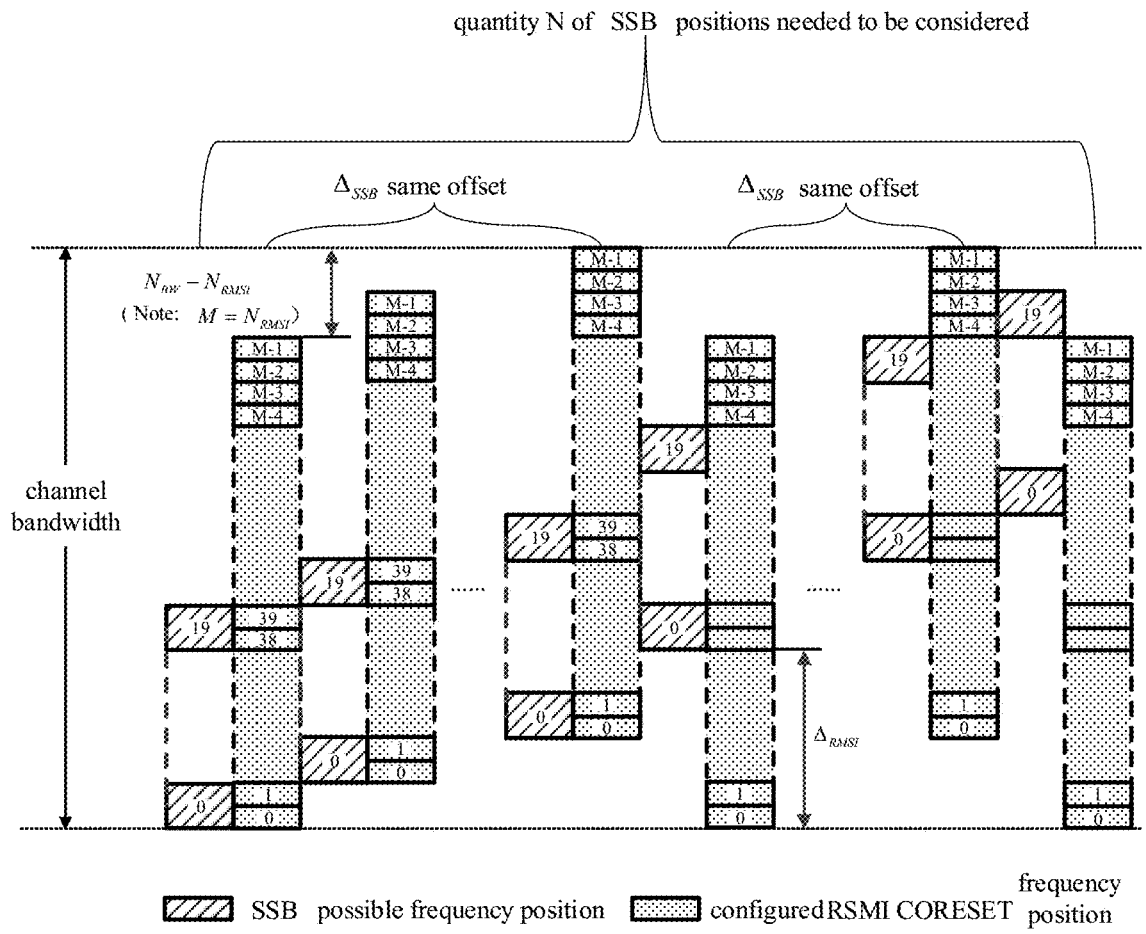
FIG. 5 is a schematic view of another frequency offset configuration of a system information configuration method in some embodiments of the present disclosure.

FIG. 3, FIG. 4, and FIG. 5 are schematic views of frequency offset configuration using the above-described system information configuration methods of some embodiments of the present disclosure in three typical scenarios, respectively. In the scenario of FIG. 3, in the scenario of FIG. 4, In the scenario of FIG. 5, where. $SCS_{SSB}=SCS_{RMSI}$ μ=0 $2SCS_{SSB}=SCS_{RMSI}$ μ=−1 $SCS_{SSB}=2SCS_{RMSI}$ μ=1 M=$N_{RMSI}$ The RMSI CORESET frequency offset configuration table of the NR band in which the carrier frequency is lower than 6 GHz, which is generated using the above-described system information configuration method in some embodiments of the present disclosure, will be described as an example.

Table 1 below provides different channel bandwidths to be considered when designing frequency offsets in some embodiments of the present disclosure, the quantity of channel bandwidths RB (Resource Block, resource blocks) at different channel bandwidths for different SCS (granularity is RMSI RB), and the quantity of RMSI CORESET bandwidths RB to be considered when designing frequency offsets (granularity is RMSI RB).

TABLE 1

| SCS (kHz) | Channel bandwidth (MHz) | Channel bandwidth RB Number $N_{BW}$ (RBs) | RMSI CORESET bandwidth RB number $N_{RMSI}$ (RBs) |
|---|---|---|---|
| 15 | 5 | 25 | 24 |
|  | 10 | 52 | 48 |
|  | 20 | 106 | 96 |
| 30 | 10 | 24 | 24 |
|  | 20 | 51 | 48 |
|  | 40 | 106 | 96 | with respect to the SS Raster parameter:

In the frequency range of [0-2.65 GHz], the frequency band having the minimum channel bandwidth of 5 MHz, the defined SS Raster interval is 900 kHz. For example, when SSB SCS is 15 kHz, SSB RB=12*15 kHz=180 kHz, the SS Raster interval is 900 kHz, meaning that one RB of every five SSB RB can place SS Raster, i.e.: similarly, when SSB SCS is 30 kHz, $N_{Sync}$=floor(900 kHz/180 kHz)=5 RBs $N_{Sync}$=floor(900 kHz/360 kHz)=2 RBs In the frequency range of [0-2.65 GHz], the frequency band having the minimum channel bandwidth of 10 MHz, the defined SS Raster interval is 1800 kHz. For example, when SSB SCS is 15 kHz, SSB RB=12*15 kHz=180 kHz the SS Raster interval is 1800 kHz, meaning that one RB in every 10 SSB RB can place the SS Raster, i.e., similarly, when SSB SCS is 30 kHz, $N_{Sync}$=floor(1800 kHz/180 kHz)=10 RBs $N_{Sync}$=floor(1800 kHz/360 kHz)=5 RBs In the frequency range of [2.4, 6 GHz], the frequency band having the minimum channel bandwidth of 10 MHz, the defined SS Raster interval is 3*1.44=4.32 MHz. For example, when SSB SCS is 15 kHz, SSB RB=12*15 kHz=180 kHz, the SS Raster interval is 4.32 MHz, meaning that one RB in every 24 SSB RB can place SS Raster, i.e.: Similarly, when SSB SCS is 30 kHz, $N_{Sync}$=floor(4.32 MHz/180 kHz)=24 RBs $N_{Sync}$=floor(4.32 MHz/360 kHz)=12 RBs In the frequency range of [2.4, 6 GHz], the frequency band having the minimum channel bandwidth of 40 MHz, the defined SS Raster interval is 21*1.44=30.24 MHz. For example, when SSB SCS is 30 kHz. The SS Raster interval is 30.24 MHz, meaning that one RB in each 84 SSB RB can place the SS Raster, i.e., SSB RB=12*30 kHz=360 kHz $N_{Sync}$=floor(30.24 MHz/360 kHz)=84RBs Tables 2 to 4, 5a and 5b give frequency offset configuration parameters when {SSB SCS, RMSI SCS} is {15,15} kHz, {15,30} kHz, {30,15} kHz, {30,30} kHz, respectively.

The frequency offset configuration parameters corresponding to the first three items in Tables 2 to 4 and 5a (a frequency band in which the [0-2.65 GHz] minimum channel bandwidth is 5 MHz, a frequency band in which the [0-2.65 GHz] minimum channel bandwidth is 10 MHz, and a frequency band in which the [2.4-6 GHz] minimum channel bandwidth is 10 MHz) and the frequency offset configuration parameters in Table 5b are calculated based on the flow chart for determining the frequency offset configuration parameters, Table 1, and the above SS Raster parameter information in the above system information configuration methods of some embodiments of the present disclosure. The configuration parameters of Table 13-1 or Table 13-2 from TS 38.213 [1] are also compared in Table 2 to Table 4, Table 5a.

where N/A represents no value.

TABLE 2

| | Frequency offset configuration when {SSB SCS, RMSI SCS} is {15, 15} kHz | | | | | | | | | |
|---|---|---|---|---|---|---|---|---|---|---|
| Name | [0-2.65 GHz] Frequency band with a minimum channel bandwidth of 5 MHz | | | [0-2.65 GHz] Frequency band with a minimum channel bandwidth of 10 MHz | | [2.4-6 GHz] Frequency band with a minimum channel bandwidth of 10 MHz | | Table 13 & # x2212; 1 from TS 38.213 [1] | | |
| $N_{Sync}$ (RB) | 5 | | | 10 | | 24 | | — | | |
| Channel Bandwidth (MHz) | 5 | 10 | 20 | 10 | 20 | 10 | 20 | 5 | 10 | 20 |
| Number of channel bandwidth RBs $N_{BW}$ | 25 | 52 | 106 | 52 | 106 | 52 | 106 | 25 | 52 | 106 |
| Number of RMSI CORESET Bandwidth RBs $N_{RMSI}$ | 24 | 48 | 96 | 48 | 96 | 48 | 96 | 24 | 48 | 96 |
| Frequency offset step $Δ_{RMSI}$ | 2 | N/A | N/A | 5 | N/A | 5 | 11 | 2 | 4 | N/A |

TABLE 2-continued

Frequency offset configuration when {SSB SCS, RMSI SCS} is {15, 15} kHz

| Name | [0-2.65 GHz] Frequency band with a minimum channel bandwidth of 5 MHz | | [0-2.65 GHz] Frequency band with a minimum channel bandwidth of 10 MHz | | [2.4-6 GHz] Frequency band with a minimum channel bandwidth of 10 MHz | | Table 13 & #x2212;1 from TS 38.213 [1] | | | |
|---|---|---|---|---|---|---|---|---|---|---|
| Number of candidate frequency offsets P | 3 | 1 | 1 | 2 | 1 | 5 | 3 | 3 | 2 | 1 |
| Initial offset $O_0$ | 0 | 14 | 38 | 11 | 38 | 4 | 27 | 0 | 12 | 38 |

TABLE 3

Frequency offset configuration when {SSB SCS, RMSI SCS} is {15, 30} kHz

| Name | [0-2.65 GHz] Frequency band with a minimum channel bandwidth of 5 MHz | | [0-2.65 GHz] Frequency band with a minimum channel bandwidth of 10 MHz | | [2.4-6 GHz] Frequency band with a minimum channel bandwidth of 10 MHz | | Table 13-2 from TS 38.213 [1] | |
|---|---|---|---|---|---|---|---|---|
| $N_{Sync}$ (RB) | 5 | | 10 | | 24 | | — | |
| Channel Bandwidth (MHz) | 10 | 20 | 10 | 20 | 10 | 20 | 10 | 20 |
| Number of channel bandwidth RBs $N_{BW}$ | 24 | 51 | 24 | 51 | 24 | 51 | 24 | 51 |
| Number of RMSI CORESET Bandwidth RBs $N_{RMSI}$ | 24 | 48 | 24 | 48 | 24 | 48 | 24 | 48 |
| Frequency offset step $\Delta_{RMSI}$ | 1 | 4 | 1 | 4 | 1 | 4 | 1 | 2 |
| Number of candidate frequency offsets P | 3 | 1 | 5 | 2 | 12 | 3 | 3 | 2 |
| Initial offset $O_0$ | 6 | 19 | 15 | 17 | 1 | 15 | 6 | 18 |

TABLE 4

Frequency offset configuration when {SSB SCS, RMSI SCS} is {30, 15} kHz

| Name | [0-2.65 GHz] Frequency band with a minimum channel bandwidth of 5 MHz | | [0-2.65 GHz] Frequency band with a minimum channel bandwidth of 10 MHz | | [2.4-6 GHz] Frequency band with a minimum channel bandwidth of 10 MHz | | Table 13-2 from TS 38.213 [1] | |
|---|---|---|---|---|---|---|---|---|
| $N_{Sync}$ (RB) | 2 | | 5 | | 12 | | — | |
| Channel Bandwidth (MHz) | 10 | 20 | 10 | 20 | 10 | 20 | 10 | 20 |
| Number of channel bandwidth RBs $N^{BW}$ | 52 | 106 | 52 | 106 | 52 | 106 | 52 | 106 |
| Number of RMSI CORESET Bandwidth RBs $N_{RMSI}$ | 48 | 96 | 48 | 96 | 48 | 96 | 48 | 96 |
| Frequency offset step $\Delta_{RMSI}$ | 4 | N/A | 4 | N/A | 4 | 10 | 4 | N/A |
| Number of candidate frequency offsets P | 2 | 1 | 3 | 1 | 3 | 3 | 2 | 1 |
| Initial offset $O_0$ | 2 | 28 | 0 | 28 | 0 | 18 | 2 | 28 |

TABLE 5a

Frequency offset configuration when {SSB SCS, RMSI SCS} is {30, 30} kHz

| Name | [0-2.65 GHz] Frequency band with a minimum channel bandwidth of 5 MHz | | [0-2.65 GHz] Frequency band with a minimum channel bandwidth of 10 MHz | | [2.4-6 GHz] Frequency band with a minimum channel bandwidth of 10 MHz | | Table 13 & #x2212; 1 from TS 38.213 [1] | |
|---|---|---|---|---|---|---|---|---|
| $N_{Sync}$ (RB) | 2 | | 5 | | 12 | | — | |
| Channel Bandwidth (MHz) | 10 | 20 | 10 | 20 | 10 | 20 | 10 | 20 |
| Number of channel bandwidth RBs $N_{BW}$ | 24 | 51 | 24 | 51 | 24 | 51 | 24 | 51 |
| Number of RMSI CORESET Bandwidth RBs $N_{RMSI}$ | 24 | 48 | 24 | 48 | 24 | 48 | 48 | 96 |
| Frequency offset step $\Delta_{RMSI}$ | 1 | 4 | 1 | 4 | 1 | 4 | 1 | 2 |
| Number of candidate frequency offsets P | 3 | 1 | 5 | 2 | 5 | 3 | 5 | 2 |
| Initial offset $O_0$ | 1 | 14 | 0 | 12 | 0 | 10 | 0 | 12 |

TABLE 5b

Frequency offset configuration when {SSB SCS, RMSI SCS} is {30, 30} kHz

| Name | [2.4-6 GHz] Frequency band with a minimum channel bandwidth of 40 MHz | | |
|---|---|---|---|
| $N_{Sync}$ (RB) | 84 | | |
| Channel Bandwidth (MHz) | 40 | 40 | 40 |
| Number of channel bandwidth RBs $N_{BW}$ | 106 | 106 | 106 |
| Number of RMSI CORESET Bandwidth RBs $N_{RMSI}$ | 24 | 48 | 96 |
| Frequency offset step $\Delta_{RMSI}$ | 4 | 28 | 11 |
| Number of candidate frequency offsets P | 2 | 2 | 8 |
| Initial offset $O_0$ | 0 | 0 | 0 |

As shown in Table 2, in the frequency band where the minimum channel bandwidth of [0-2.65 GHz] is 5 MHz, the frequency offset configuration parameters of Table 13-1 of TS 38.213 [1] are consistent with the frequency offset configuration parameters obtained using the method in some embodiments of the present disclosure when the channel bandwidths are 5 MHz and 20 MHz, but when the channel bandwidth is 10 MHz, the method in some embodiments of the present disclosure requires only one offset number, and table 13-1 of TS 38.213 [1] obviously does not take into account the scenario where the minimum channel bandwidth is 10 MHz, while in some embodiments of the present disclosure the frequency offset configuration parameters for the frequency band where the minimum channel bandwidth of [0-2.65 GHz] is 10 MHz are also given.

The method in some embodiments of the present disclosure, for a frequency offset configuration table of RMSI CORESET versus SSB, is jointly designed taking into account combinations of different SSB SCS and RMSI SCS, different channel bandwidths, different SS Raster definitions in different carrier bands, and different RMSI CORESET bandwidths.

In addition, a separate frequency offset configuration table is used for each of the carrier frequency band in the [0-2.65 GHz] frequency range and the carrier frequency band in the [2.4 GHz-6 GHz] frequency range.

In addition, in the frequency range of [0-2.65 GHz], the minimum channel bandwidths of 5 MHz and 10 MHz are configured using the same frequency offset table by a reasonable design.

Specifically, Table 5a, {SSB SCS, RMSI SCS} is exemplified as {30, 30} kHz. When the minimum channel bandwidth is 10 MHz, the candidate sets of required frequency offsets according to Table 5a are {0, 1, 2, 3, 4} and {12, 18}, respectively, for the RMSI CORESET bandwidth RB numbers $N_{RMSI}$ being 24RBs and 48RBs. When the minimum channel bandwidth is 5 MHz and the quantity of RMSI CORESET bandwidths RB is 24RBs, the candidate set of required frequency offsets according to Table 5a is {1, 2, 3}. Thus, for $N_{RMSI}$ being 24RBs, the frequency offset at a minimum channel bandwidth of 10 MHz already includes all the frequency offsets required at a minimum channel bandwidth of 5 MHz. For $N_{RMSI}$ being 48RBs, the first frequency offset given in Table 5a at a minimum channel bandwidth of 5 MHz is also the only frequency offset $O_0=14$ required. Since the first frequency offset can be virtually any value from 0 to, such as 12, the frequency offset at a minimum channel bandwidth of 10 MHz for $N_{RMSI}$ being 48RBs already includes all the frequency offsets required at a minimum channel bandwidth of 5 MHz. Therefore, by a reasonable design, it is possible to make the minimum channel bandwidths 5 MHz and 10 MHz use the same frequency offset configuration table.

Among them, TS 38.213 Table 13-1 to Table 13-4 can be modified based on the method in some embodiments of the present disclosure for the frequency range of [0-2.65 GHz], with the minimum channel bandwidth of 5 MHz and 10 MHz frequency offset using the same configuration table. Table 13-1, Table 13-2, Table 13-3 and Table 13-4 in the modified TS 38.213 are shown in Tables 6 to 9 below.

Here, in TS 38.213, a frequency offset configuration table used for a frequency band having a minimum channel bandwidth of 10 MHz in the frequency range of [2.4-6 GHz] is added, as shown in Tables 10 to 13.

Further, for a frequency range of [2.4-6 GHz], the minimum channel bandwidth is 40 MHz, and the SS Raster interval is 30.24 MHz. For example, when the SCS is 30 kHz, only one RB can place SS Raster per 84 SSB RB. The frequency offset configuration values used may be as shown in Table 13. Unlike the frequency range of [2.4-6 GHz], where the minimum channel bandwidth is a frequency band of 10 MHz, we recommend increasing in TS 38.213 the frequency offset configuration table for the frequency range of [2.4-6 GHz] where the minimum channel bandwidth is a 40 MHz frequency band and {SSB SCS, RMSI SCS} is {30,30} kHz, as shown in Table 14.

Further, Tables 8 and 12 can be combined into one table, Table 15. Similarly, Tables 9 and 13 may well be combined into one table, Table 16.

TABLE 6

(TS 38.213 Table 13-1): For the frequency band of the [0-2.65 GHz] frequency range, when the subcarrier spacing of {SS/PBCH block, PDCCH} is {15, 15} kHz, the slot symbols of the RBs set and CORESET for the type 0-PDCCH search space.

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 11 |
| 7 | 1 | 48 | 1 | 16 |
| 8 | 1 | 48 | 2 | 11 |
| 9 | 1 | 48 | 2 | 16 |
| 10 | 1 | 48 | 3 | 11 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | | Reserved | |

TABLE 7

(TS 38.213 Table 13-2): Time slot symbols for the RBs set and the CORESET of the type 0-PDCCH search space when the subcarrier spacing of the PDCCH} is {15, 30} kHz for the frequency band of the [0-2.65 GHz] frequency range {SS/PBCH block, PDCCH}

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 5 |
| 1 | 1 | 24 | 2 | 6 |
| 2 | 1 | 24 | 2 | 7 |
| 3 | 1 | 24 | 2 | 8 |
| 4 | 1 | 24 | 2 | 9 |
| 5 | 1 | 24 | 3 | 5 |
| 6 | 1 | 24 | 3 | 6 |
| 7 | 1 | 24 | 3 | 7 |
| 8 | 1 | 24 | 3 | 8 |
| 9 | 1 | 24 | 3 | 9 |
| 10 | 1 | 48 | 1 | 18 |
| 11 | 1 | 48 | 1 | 20 |
| 12 | 1 | 48 | 2 | 18 |
| 13 | 1 | 48 | 2 | 20 |
| 14 | 1 | 48 | 3 | 18 |
| 15 | 1 | 48 | 3 | 20 |

TABLE 8

(TS 38.213 Table 13-3): For the frequency band of the [0-2.65 GHz] frequency range, when the subcarrier spacing {SS/PBCH block, PDCCH} is {30, 15} kHz, the time slot symbols of the RBs set and CORESET for the type 0-PDCCH search space

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 2 | 0 |
| 4 | 1 | 48 | 2 | 4 |
| 5 | 1 | 48 | 2 | 8 |
| 6 | 1 | 48 | 3 | 0 |
| 7 | 1 | 48 | 3 | 4 |
| 8 | 1 | 48 | 3 | 8 |
| 9 | 1 | 96 | 1 | 28 |
| 10 | 1 | 96 | 2 | 28 |
| 11 | 1 | 96 | 3 | 28 |
| 12 | Reserved | | | |
| 13 | Reserved | | | |
| 14 | Reserved | | | |
| 15 | Reserved | | | |

TABLE 9

(TS 38.213 Table 13-4): For the frequency band of the [0-2.65 GHz] frequency range, when the subcarrier spacing {SS/PBCH block, PDCCH} is {30, 30} kHz, the RBs set for the type 0-PDCCH search space and the slot symbols of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 12 |
| 11 | 1 | 48 | 1 | 16 |
| 12 | 1 | 48 | 2 | 12 |
| 13 | 1 | 48 | 2 | 16 |
| 14 | Reserved | | | |
| 15 | Reserved | | | |

TABLE 10

(TS 38.213 Table 13-x1): For the frequency band of the [2.4-6 GHz] frequency range, when the subcarrier spacing {SS/PBCH block, PDCCH} is {15, 15} kHz, the RBs set for the type 0-PDCCH search space and the slot symbols of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 4 |
| 7 | 1 | 48 | 1 | 9 |
| 8 | 1 | 48 | 1 | 14 |

TABLE 10-continued (TS 38.213 Table 13-x1): For the frequency band of the [2.4-6 GHz] frequency range, when the subcarrier spacing {SS/PBCH block, PDCCH} is {15, 15} kHz, the RBs set for the type 0-PDCCH search space and the slot symbols of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 9  | 1 | 48 | 1 | 19 |
| 10 | 1 | 48 | 1 | 24 |
| 11 | 1 | 48 | 2 | 4  |
| 12 | 1 | 48 | 2 | 9  |
| 13 | 1 | 48 | 2 | 14 |
| 14 | 1 | 48 | 2 | 19 |
| 15 | 1 | 48 | 2 | 24 |

TABLE 11

(TS 38.213 Table 13-x2): For the frequency band of the [2.4-6 GHz] frequency range, when the subcarrier spacing {SS/PBCH block, PDCCH} is {15, 30} kHz, the RBs set for the type 0-PDCCH search space and the slot symbol of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0  | 1 | 24 | 2 | 1  |
| 1  | 1 | 24 | 2 | 2  |
| 2  | 1 | 24 | 2 | 3  |
| 3  | 1 | 24 | 2 | 4  |
| 4  | 1 | 24 | 2 | 5  |
| 5  | 1 | 24 | 2 | 6  |
| 6  | 1 | 24 | 2 | 7  |
| 7  | 1 | 24 | 2 | 8  |
| 8  | 1 | 24 | 2 | 9  |
| 9  | 1 | 24 | 2 | 10 |
| 10 | 1 | 24 | 2 | 11 |
| 11 | 1 | 24 | 2 | 12 |
| 12 | 1 | 48 | 1 | 15 |
| 13 | 1 | 48 | 1 | 19 |
| 14 | 1 | 48 | 1 | 23 |
| 15 | Reserved | | | |

TABLE 12

(TS 38.213 Table 13-x3): For the frequency band of the [2.4-6 GHz] frequency range, when the subcarrier spacing {SS/PBCH block, PDCCH} is {30, 15} kHz, the RBs set for the type 0-PDCCH search space and the slot symbols of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0  | 1 | 48 | 1 | 0  |
| 1  | 1 | 48 | 1 | 4  |
| 2  | 1 | 48 | 1 | 8  |
| 3  | 1 | 48 | 2 | 0  |
| 4  | 1 | 48 | 2 | 4  |
| 5  | 1 | 48 | 2 | 8  |
| 6  | 1 | 48 | 3 | 0  |
| 7  | 1 | 48 | 3 | 4  |
| 8  | 1 | 48 | 3 | 8  |
| 9  | 1 | 96 | 1 | 18 |
| 10 | 1 | 96 | 1 | 28 |
| 11 | 1 | 96 | 1 | 38 |
| 12 | 1 | 96 | 2 | 18 |
| 13 | 1 | 96 | 2 | 28 |
| 14 | 1 | 96 | 2 | 38 |
| 15 | Reserved | | | |

TABLE 13

(TS 38.213 Table 13-x4): For the frequency band of the [2.4-6 GHz] frequency range,
when the subcarrier spacing {SS/PBCH block, PDCCH} is {30, 30} kHz,
the RBs set for the type 0-PDCCH search space and the slot symbol of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 10 |
| 11 | 1 | 48 | 1 | 14 |
| 12 | 1 | 48 | 1 | 18 |
| 13 | 1 | 48 | 2 | 10 |
| 14 | 1 | 48 | 2 | 14 |
| 15 | 1 | 48 | 2 | 18 |

TABLE 14

(TS 38.213 Table 13-x5): For the frequency band where the minimum
channel bandwidth is 40 MHz for the [2.4-6 GHz] frequency range,
when the sub-carrier spacing of {SS/PBCH block, PDCCH}
is {30, 30} kHz, the time slot symbols of the RBs set and
CORESET for the type 0-PDCCH search space

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 0 |
| 5 | 1 | 48 | 1 | 28 |
| 6 | 1 | 48 | 2 | 0 |
| 7 | 1 | 48 | 2 | 28 |
| 8 | 1 | 96 | 1 | 0 |
| 9 | 1 | 96 | 1 | 11 |
| 10 | 1 | 96 | 1 | 22 |
| 11 | 1 | 96 | 1 | 33 |
| 12 | 1 | 96 | 1 | 44 |
| 13 | 1 | 96 | 1 | 55 |
| 14 | 1 | 96 | 1 | 66 |
| 15 | 1 | 96 | 1 | 77 |

TABLE 15

(TS 38.213 Table 13-3): When the subcarrier spacing
{SS/PBCH block, PDCCH} is {30, 15} kHz, the RBs set for the
type 0-PDCCH search space and the slot symbol of CORESET

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 2 | 0 |
| 4 | 1 | 48 | 2 | 4 |
| 5 | 1 | 48 | 2 | 8 |
| 6 | 1 | 48 | 3 | 0 |
| 7 | 1 | 48 | 3 | 4 |
| 8 | 1 | 48 | 3 | 8 |
| 9 | 1 | 96 | 1 | 18 |
| 10 | 1 | 96 | 1 | 28 |
| 11 | 1 | 96 | 1 | 38 |
| 12 | 1 | 96 | 2 | 18 |
| 13 | 1 | 96 | 2 | 28 |
| 14 | 1 | 96 | 2 | 38 |
| 15 | Reserved | | | |

TABLE 16

(TS 38.213 Table 13-4): RBs set for type 0-PDCCH search space
and slot symbols of CORESET when {SS/PBCH block, PDCCH}
subcarrier spacing is {30, 30} kHz.

| Index | SS/PBCH Block and CORESET Multiplexing Mode | RBs number $N_{RB}^{CORESET}$ | Number of symbols $N_{symb}^{CORESET}$ | Frequency offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 2 | 4 |
| 5 | 1 | 24 | 3 | 0 |
| 6 | 1 | 24 | 3 | 1 |
| 7 | 1 | 24 | 3 | 2 |
| 8 | 1 | 24 | 3 | 3 |
| 9 | 1 | 24 | 3 | 4 |
| 10 | 1 | 48 | 1 | 10 |
| 11 | 1 | 48 | 1 | 14 |
| 12 | 1 | 48 | 1 | 18 |
| 13 | 1 | 48 | 2 | 10 |
| 14 | 1 | 48 | 2 | 14 |
| 15 | 1 | 48 | 2 | 18 |

In summary, some embodiments of the present disclosure provide a systematic system information configuration method for designing all RMSI CORESET configurations based on a rule of minimizing all possible quantities of candidate frequency offset positions within a SS Raster interval, and a rule of aligning the SSB with the RMSI CORESET center, given a combination of carrier frequency bands, channel bandwidths, SSB SCS, and RMSI SCS. The method according to the embodiment of the present invention is used to modify and redesign the existing configuration method in the 3GPP protocol standard, thereby ensuring the correctness of the protocol configuration method.

Figure 6:
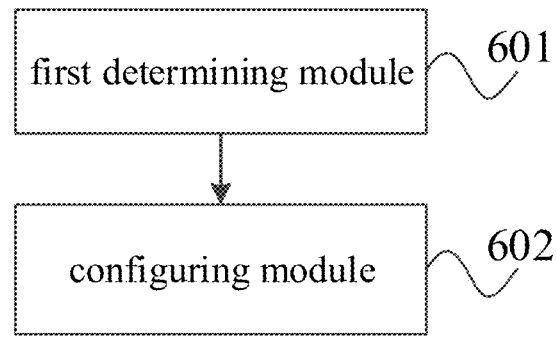
FIG. 6 is a schematic view of a system information configuration device in some embodiments of the present disclosure.

In some embodiments of the present disclosure, as shown in FIG. 6, a system information configuration device is also provided in an embodiment of the present disclosure, including:

a first determining module 601, configured to determine, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter;

a configuring module 602, configured to perform a frequency offset configuration of the RMSI CORESET with respect to the SSB according to the frequency offset configuration parameter.

According to the system information configuration device in some embodiments of the present disclosure, the frequency offset configuration of the RMSI CORESET with respect to the SSB is performed by combining factors such as the combination of the RMSI SCS and the SSB SCS, the channel bandwidth, the SS Raster, and the RMSI CORESET bandwidth. In consideration of the above, the protocol configuration method is improved, and correctness of the protocol configuration is ensured.

Optionally, the first determining module 601 includes:

a first determining submodule, configured to determine, based on the target parameters corresponding to carrier frequency bands in different frequency ranges, the frequency offset configuration parameters of the carrier frequency bands in different frequency ranges;

The configuration module 602 includes:

a first configuring submodule, configured to perform the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Optionally, the first determining submodule comprises:

a first determining unit, configured to determine the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

Optionally, the carrier frequency bands in different frequency ranges include a carrier frequency band in a frequency range of 0 to 2.65 GHz and/or a carrier frequency band in a frequency range of 2.4 GHz to 6 GHz;

a minimum channel bandwidth of the carrier frequency band in the frequency range of 0 to 2.65 GHz includes 5 MHz, 10 MHz and/or 20 MHz;

a minimum channel bandwidth of the carrier frequency band in the frequency range of 2.4 GHz to 6 GHz includes 10 MHz, 20 MHz, and/or 40 MHz.

Optionally, the minimum channel bandwidth of the carrier frequency band in the frequency range of 0 to 2.65 GHz includes 5 MHz and 10 MHz, and the same frequency offset configuration table at the minimum channel bandwidths of 5 MHz and 10 MHz is used for the carrier frequency bands in the frequency range of 0 to 2.65 GHz.

Optionally, the frequency offset configuration parameter includes a candidate frequency offset quantity and a frequency offset.

The first determining module 601 includes:

a second determining submodule configured to determine the candidate frequency offset quantity and the frequency offset based on the target parameter which is predetermined and a predetermined rule, where the predetermined rule includes one or more of a rule of minimizing all possible quantities of candidate frequency offset positions within one SS Raster interval and a rule of aligning the SSB with a center of the RMSI CORESET.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval.

The second determining submodule includes:

a second determining unit, configured to determine, based on the quantity of RBs within the channel bandwidth and the quantity of RBs within the RMSI CORESET bandwidth, a maximum quantity of positions of the SSB supportable by each offset value in a configuration;

a third determining unit, configured to determine, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

a fourth determining unit, configured to determine the candidate frequency offset quantity, based on the maximum quantity of RB positions possible for placing SS Rasters in the channel bandwidth and the maximum quantity of positions of the SSB supportable by each offset value in the configuration;

a fifth determining unit, configured to determine a candidate set of frequency offsets, based on the candidate frequency offset quantity, the maximum quantity of positions of the SSB supportable by each offset value in the configuration and a predefined initial offset.

Optionally, the second determining unit includes:

a first determining subunit, configured to determine the maximum quantity of positions $A_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$A_{SSB}=\text{floor}([(N_{BW}-N_{RMSI})+1]*2^{-\mu});$$

where $\mu$ is a scaling factor between the SCS of the SSB and the SCS of the RMSI, and floor represents a rounding down function Optionally, the third determining unit includes:

a second determining subunit, configured to determine the maximum quantity of RB positions possible for placing the SS Rasters in the channel bandwidth, based on the quantity $N_{SB}$ of RBs in a granularity of SSB RB within the channel bandwidth and through the following formula:

$$N'=N_{SSB}-19;$$

a third determining subunit configured to determine the maximum quantity N of candidate RB positions possible for placing the SS Rasters in the channel bandwidth, based on the SS Raster interval $N_{Sync}$ in a granularity of SSB RB and N' and through the following formula:

$$N = \min(N_{Sync}, N')$$

where min represents a minimum value finding function.

Optionally, the fourth determining unit includes:

a fourth determining subunit configured to determine the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

where ceiling represents an rounding up function.

Optionally, the fifth determining unit includes:

a fifth determining subunit configured to determine a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^\mu, & \text{if } \Delta_{SSB} \leq (N_{RMSI} * 2^{-\mu} - 20) \\ N_{RMSI} - 20 * 2^\mu, & \text{if } \Delta_{SSB} > (N_{RMSI} * 2^{-\mu} - 20) \end{cases};$$

where μ is a scaling factor between the SCS of the SSB and the SCS of the RMSI; $N_{RMSI}$ is the quantity of RBs in a granularity of RMSI RB in the RMSI CORESET bandwidth;

a sixth determining subunit configured to determine a value of an $i^{th}$ frequency offset $O_i$ in the candidate set of frequency offsets, based on the candidate frequency offset quantity P, the frequency offset step size $\Delta_{RMSI}$ and the predefined initial offset $O_0$ and through the following formula:

$$O_i = O_0 + (i-1) * \Delta_{RMSI};$$

where $1 \leq i \leq P$.

Optionally, the device further includes:

a second determining module, configured to determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

Optionally, the second determining module includes:

a third determining submodule, configured to determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula:

$$O_0 = \text{floor}\left(\frac{N_{RMSI} - 20 * 2^\mu - (P-1)\Delta_{RMSI}}{2}\right)$$

According to the system information configuration device in some embodiments of the present disclosure, the frequency offset configuration of the RMSI CORESET with respect to the SSB is performed by combining factors such as the combination of the RMSI SCS and the SSB SCS, the channel bandwidth, the SS Raster, and the RMSI CORESET bandwidth. In consideration of the above, the protocol configuration method is improved, and correctness of the protocol configuration is ensured.

It should be noted that all the implementations of the system information configuration method described above are applicable to the embodiments of the system information configuration device, and the same technical effect can be achieved.

Figure 7:
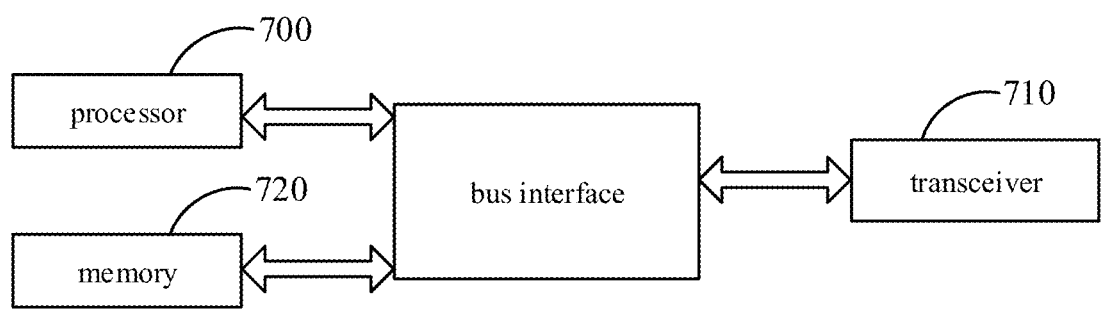
FIG. 7 is another schematic view of a system information configuration device in some embodiments of the present disclosure.

In some embodiments of the present disclosure, as shown in FIG. 7, a system information configuration device is further provided, including a transceiver 710, a memory 720, a processor 700, a bus interface, and a computer program stored in the memory 720 and executable on the processor 700;

The processor 700 is configured to read a program in a memory to determine, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and perform a frequency offset configuration of the RMSI CORESET with respect to the SSB according to the frequency offset configuration parameter.

According to the system information configuration device of some embodiments of the present disclosure, the frequency offset configuration of the RMSI CORESET with respect to the SSB is performed by combining factors such as the combination of the RMSI SCS and the SSB SCS, the channel bandwidth, the SS Raster, and the RMSI CORESET bandwidth. In consideration of the above, the protocol configuration method is improved, and correctness of the protocol configuration is ensured.

In FIG. 7, the bus architecture may include any number of interconnected buses and bridges, specifically, the various circuits of one or more processors represented by the processor 700 and the memory represented by the memory 720 are linked together. The bus architecture may also link various other circuits, such as peripherals, voltage regulators, and power management circuits, all of which are well known in the art and therefore will not be described further herein. The bus interface provides an interface. Transceiver 710 may be a plurality of elements, including a transmitter and a transceiver, providing units for communicating with various other devices on a transmission medium. The processor 700 is responsible for managing the bus architecture and general processing, and the memory 720 may store data used by the processor 700 in performing operations.

Optionally, the processor 700 is configured to read the program in the memory to:

determine, based on the target parameters corresponding to carrier frequency bands in different frequency ranges, the frequency offset configuration parameters of the carrier frequency bands in different frequency ranges;

perform the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Optionally, the processor 700 is configured to read the program in the memory to:

determine the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

Optionally, the carrier frequency bands in different frequency ranges include a carrier frequency band in a frequency range of 0 to 2.65 GHz and/or a carrier frequency band in a frequency range of 2.4 GHz to 6 GHz;

a minimum channel bandwidth of the carrier frequency band in the frequency range of 0 to 2.65 GHz includes 5 MHz, 10 MHz and/or 20 MHz;

a minimum channel bandwidth of the carrier frequency band in the frequency range of 2.4 GHz to 6 GHz includes 10 MHz, 20 MHz, and/or 40 MHz.

Optionally, the minimum channel bandwidth of the carrier frequency band in the frequency range of 0 to 2.65 GHz includes 5 MHz and 10 MHz, and the same frequency offset configuration table at the minimum channel bandwidths of 5 MHz and 10 MHz is used for the carrier frequency bands in the frequency range of 0 to 2.65 GHz.

Optionally, the frequency offset configuration parameter includes a candidate frequency offset quantity and a frequency offset;

the processor 700 is configured to read the program in the memory to:

determine the candidate frequency offset quantity and the frequency offset based on the target parameter which is predetermined and a predetermined rule;

where the predetermined rule includes one or more of a rule of minimizing all possible quantities of candidate frequency offset positions within one SS Raster interval and a rule of aligning the SSB with a center of the RMSI CORESET.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval;

the processor 700 is configured to read the program in the memory to:

determine, based on the quantity of RBs within the channel bandwidth and the quantity of RBs within the RMSI CORESET bandwidth, a maximum quantity of positions of the SSB supportable by each offset value in a configuration;

determine, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

determine the candidate frequency offset quantity, based on the maximum quantity of RB positions possible for placing SS Rasters in the channel bandwidth and the maximum quantity of positions of the SSB supportable by each offset value in the configuration; and determine a candidate set of frequency offsets, based on the candidate frequency offset quantity, the maximum quantity of positions of the SSB supportable by each offset value in the configuration and a predefined initial offset.

Optionally, the processor 700 is configured to read the program in the memory to:

determine the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$\Delta_{SSB} = \text{floor}([(N_{BW} - N_{RMSI}) + 1] * 2^{-\mu});$$

where $\mu$ is a scaling factor between the SCS of the SSB and the SCS of the RMSI, and floor represents a rounding down function.

Optionally, the processor 700 is configured to read the program in the memory to:

determine the maximum quantity N' of RB positions possible for placing the SS Rasters in the channel bandwidth, based on the quantity $N_{SSB}$ of RBs in a granularity of SSB RB within the channel bandwidth and through the following formula:

$$N' = N_{SSB} - 19;$$

determine the maximum quantity N of candidate RB positions possible for placing the SS Rasters in the channel bandwidth, based on the SS Raster interval $N_{Sync}$ in a granularity of SSB RB and N' and through the following formula:

$$N = \min(N_{Sync}, N');$$

where min represents a minimum value finding function.

Optionally, the processor 700 is configured to read the program in the memory to:

determine the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

where ceiling represents an rounding up function.

Optionally, the processor 700 is configured to read the program in the memory to:

determine a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^{\mu}, & \text{if } \Delta_{SSB} \le (N_{RMSI} * 2^{-\mu} - 20) \\ N_{RMSI} - 20 * 2^{\mu}, & \text{if } \Delta_{SSB} > (N_{RMSI} * 2^{-\mu} - 20) \end{cases};$$

where $\mu$ is a scaling factor between the SCS of the SSB and the SCS of the RMSI; $N_{RMSI}$ is the quantity of RBs in a granularity of RMSI RB in the RMSI CORESET bandwidth;

determine a value of an $i^{th}$ frequency offset $O_i$ in the candidate set of frequency offsets, based on the candidate frequency offset quantity P, the frequency offset step size $\Delta_{RMSI}$ and the predefined initial offset $O_0$ and through the following formula:

$$O_i = O_0 + (i-1) * \Delta_{RMSI};$$

where $1 \le i \le P$.

Optionally, the processor 700 is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

Optionally, the processor 700 is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula:

$$O_0 = \text{floor}\left(\frac{N_{RMSI} - 20 * 2^\mu - (P-1)\Delta_{RMSI}}{2}\right).$$

In some embodiments of the present disclosure, a computer readable storage medium storing a computer program is further provided, the computer program is executed by a processor to:

determine, based on a target parameter which is predetermined, a frequency offset configuration parameter of a Remaining Minimum System Information (RMSI) Control Resource Set (CORESET) with respect to a System Synchronization Block (SSB), where the target parameter includes one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and perform a frequency offset configuration of the RMSI CORESET with respect to the SSB according to the frequency offset configuration parameter.

Optionally, the processor is configured to read the program in the memory to:

determine, based on the target parameters corresponding to carrier frequency bands in different frequency ranges, the frequency offset configuration parameters of the carrier frequency bands in different frequency ranges;

perform the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

Optionally, the processor is configured to read the program in the memory to:

determine the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

Optionally, the carrier frequency bands in different frequency ranges include a carrier frequency band in a frequency range of 0 to 2.65 GHz and/or a carrier frequency band in a frequency range of 2.4 GHz to 6 GHz;

a minimum channel bandwidth of the carrier frequency band in the frequency range of 0 to 2.65 GHz includes 5 MHz, 10 MHz and/or 20 MHz;

a minimum channel bandwidth of the carrier frequency band in the frequency range of 2.4 GHz to 6 GHz includes 10 MHz, 20 MHz, and/or 40 MHz.

Optionally, the minimum channel bandwidth of the carrier frequency band in the frequency range of 0 to 2.65 GHz includes 5 MHz and 10 MHz, and the same frequency offset configuration table at the minimum channel bandwidths of 5 MHz and 10 MHz is used for the carrier frequency bands in the frequency range of 0 to 2.65 GHz.

Optionally, the frequency offset configuration parameter includes a candidate frequency offset quantity and a frequency offset;

the processor is configured to read the program in the memory to:

determine the candidate frequency offset quantity and the frequency offset based on the target parameter which is predetermined and a predetermined rule;

where the predetermined rule includes one or more of a rule of minimizing all possible quantities of candidate frequency offset positions within one SS Raster interval and a rule of aligning the SSB with a center of the RMSI CORESET.

Optionally, the channel bandwidth parameter includes a quantity of Resource Blocks (RBs) within a channel bandwidth, the RMSI CORESET bandwidth parameter includes a quantity of RBs within a RMSI CORESET bandwidth, and the SS Raster parameter includes an SS Raster interval;

the processor is configured to read the program in the memory to:

determine, based on the quantity of RBs within the channel bandwidth and the quantity of RBs within the RMSI CORESET bandwidth, a maximum quantity of positions of the SSB supportable by each offset value in a configuration;

determine, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

determine the candidate frequency offset quantity, based on the maximum quantity of RB positions possible for placing SS Rasters in the channel bandwidth and the maximum quantity of positions of the SSB supportable by each offset value in the configuration; and determine a candidate set of frequency offsets, based on the candidate frequency offset quantity, the maximum quantity of positions of the SSB supportable by each offset value in the configuration and a predefined initial offset.

Optionally, the processor is configured to read the program in the memory to:

determine the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$\Delta_{SSB} = \text{floor}([(N_{BW} - N_{RMSI}) + 1] * 2^{-\mu})$$

where $\mu$ is a scaling factor between the SCS of the SSB and the SCS of the RMSI, and floor represents a rounding down function.

Optionally, the processor is configured to read the program in the memory to:

determine the maximum quantity N' of RB positions possible for placing the SS Rasters in the channel bandwidth, based on the quantity $N_{SSB}$ of RBs in a granularity of SSB RB within the channel bandwidth and through the following formula:

$$N'=N_{SSB}-19;$$

determine the maximum quantity N of candidate RB positions possible for placing the SS Rasters in the channel bandwidth, based on the SS Raster interval $N_{Sync}$ in a granularity of SSB RB and N' and through the following formula:

$$N=\min(N_{Sync}, N');$$

where min represents a minimum value finding function.

Optionally, the processor is configured to read the program in the memory to:

determine the candidate frequency offset quantity P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \operatorname{ceiling}\left(\frac{N}{\Delta_{SSB}}\right);$$

where ceiling represents an rounding up function.

Optionally, the processor is configured to read the program in the memory to:

determine a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^{\mu}, & \text{if } \Delta_{SSB} \leq (N_{RMSI} * 2^{-\mu} - 20) \\ N_{RMSI} - 20 * 2^{\mu}, & \text{if } \Delta_{SSB} > (N_{RMSI} * 2^{-\mu} - 20) \end{cases};$$

where μ is a scaling factor between the SCS of the SSB and the SCS of the RMSI; $N_{RMSI}$ is the quantity of RBs in a granularity of RMSI RB in the RMSI CORESET bandwidth;

determine a value of an $i^{th}$ frequency offset in the candidate set of frequency offsets, based on the candidate frequency offset quantity P, the frequency offset step size $\Delta_{RMSI}$ and the predefined initial offset $O_0$ and through the following formula:

$$O_i=O_0+(i-1)*\Delta_{RMSI};$$

where $1 \leq i \leq P$.

Optionally, the processor is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET.

Optionally, the processor is configured to read the program in the memory to:

determine the initial offset $O_0$, based on the quantity $N_{RMSI}$ of RBs in the granularity of RMSI RB in the RMSI CORESET bandwidth, the candidate frequency offset quantity P and the frequency offset step size $\Delta_{RMSI}$ and the rule of aligning the SSB with the center of the RMSI CORESET and through the following formula:

$$O_0 = \operatorname{floor}\left(\frac{N_{RMSI} - 20 * 2^{\mu} - (P-1)\Delta_{RMSI}}{2}\right).$$

In the various embodiments of the present disclosure, it is to be understood that the magnitude of the sequence numbers of the processes described above is not intended to mean the order of execution, and that the order of execution of the processes should be determined by their function and intrinsic logic, and should not constitute any limitation on the implementation of some embodiments of the present disclosure.

Some embodiments of the present disclosure have been described above, it should be noted that several modifications and embellishments may be made by those of ordinary skill in the art without departing from the principles set forth in the present disclosure, and such modifications and embellishments are also considered to be within the scope of the present disclosure.

What is claimed is:

1. A system information configuration method, comprising:

determining, based on a target parameter which is predetermined, a frequency offset configuration parameter of a Remaining Minimum System Information (RMSI) Control Resource Set (CORESET) with respect to a System Synchronization Block (SSB), wherein the target parameter comprises one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and performing a frequency offset configuration of the RMSI CORESET with respect to the SSB according to the frequency offset configuration parameter;

wherein the frequency offset configuration parameter comprises a quantity of candidate frequency offsets and frequency offsets in the candidate frequency offsets;

the determining, based on the target parameter which is predetermined, the frequency offset configuration parameter of the RMSI CORESET with respect to the SSB comprises:

determining the quantity of the candidate frequency offsets and the frequency offsets in the candidate frequency offsets based on the target parameter which is predetermined and a predetermined rule;

wherein the predetermined rule comprises one or more of a rule of minimizing all possible quantities of candidate frequency offset positions within one SS Raster interval and a rule of aligning the SSB with a center of the RMSI CORESET.

2. The method according to claim 1, wherein the determining based on the target parameter which is predetermined the frequency offset configuration parameter of the RMSI CORESET with respect to the SSB comprises:

determining, based on the target parameters corresponding to carrier frequency bands in different frequency ranges, the frequency offset configuration parameters of the carrier frequency bands in different frequency ranges;

performing the frequency offset configuration of the RMSI CORESET with respect to the SSB according to the frequency offset configuration parameter comprises:
performing the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

3. The method according to claim 2, wherein the determining based on the target parameters corresponding to the carrier frequency bands in different frequency ranges the frequency offset configuration parameters of the carrier frequency bands in different frequency ranges comprises:
determining the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

4. The method according to claim 3, wherein the carrier frequency bands in different frequency ranges comprise a carrier frequency band in the frequency range of 0 to 2.65 GHz and/or a carrier frequency band in the frequency range of 2.4 GHz to 6 GHz;
a minimum channel bandwidth of the carrier frequency band in the frequency range of 0 to 2.65 GHz comprises 5 MHz, 10 MHz and/or 20 MHz;
a minimum channel bandwidth of the carrier frequency band in the frequency range of 2.4 GHz to 6 GHz comprises 10 MHz, 20 MHz, and/or 40 MHz;
wherein the minimum channel bandwidth of the carrier frequency band in the frequency range of 0 to 2.65 GHz comprises 5 MHz and 10 MHz, and the same frequency offset configuration table at the minimum channel bandwidths of 5 MHz and 10 MHz is used for the carrier frequency bands in the frequency range of 0 to 2.65 GHz.

5. The method according to claim 1, wherein the channel bandwidth parameter comprises a quantity of Resource Blocks (RBs) within a channel bandwidth, the RMSI CORESET bandwidth parameter comprises a quantity of RBs within a RMSI CORESET bandwidth, and the SS Raster parameter comprises an SS Raster interval;
the determining the quantity of the candidate frequency offsets quantity and the frequency offsets in the candidate frequency offsets based on the target parameter which is predetermined and the predetermined rule comprises:
determining, based on the quantity of RBs within the channel bandwidth and the quantity of RBs within the RMSI CORESET bandwidth, a maximum quantity of positions of the SSB supportable by each offset value in a configuration;
determining, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;
determining the quantity of the candidate frequency offsets, based on the maximum quantity of RB positions possible for placing SS Rasters in the channel bandwidth and the maximum quantity of positions of the SSB supportable by each offset value in the configuration; and
determining a candidate set of frequency offsets, based on the quantity of the candidate frequency offsets, the maximum quantity of positions of the SSB supportable by each offset value in the configuration and a predefined initial offset.

6. The method according to claim 5, wherein the determining, based on the quantity of RBs within the channel bandwidth and the quantity of RBs within the RMSI CORESET bandwidth, the maximum quantity of positions of the SSB supportable by each offset value in the configuration comprises:
determining the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$$\Delta_{SSB}=\text{floor}([(N_{BW}-N_{RMSI})+1]*2^{-\mu});$$

wherein $\mu$ is a scaling factor between the SCS of the SSB and the SCS of the RMSI, and floor represents a rounding down function.

7. The method according to claim 5, wherein the determining, based on the SS Raster interval and the maximum quantity of RB positions possible for placing SS Rasters in the channel bandwidth and according to the rule of minimizing all possible quantities of candidate frequency offset positions within one SS Raster interval, the maximum quantity of candidate RB positions possible for placing the SS Rasters in the channel bandwidth comprises:
determining the maximum quantity $N'$ of RB positions possible for placing the SS Rasters SSB in the channel bandwidth, based on the quantity of $N_{SSB}$ of RBs in a granularity of SSB RB within the channel bandwidth and through the following formula:

$$N'=N_{SSB}-19;$$

determining the maximum quantity N of candidate RB positions possible for placing the SS Rasters in the channel bandwidth, based on the SS Raster interval $N_{Sync}$ in a granularity of SSB RB and $N'$ through the following formula:

$$N=\min(N_{Sync},N');$$

wherein min represents a minimum value finding function.

8. The method according to claim 5, wherein the determining the quantity of the candidate frequency offsets, based on the maximum quantity of RB positions possible for placing SS Rasters in the channel bandwidth and the maximum quantity of positions of the SSB supportable by each offset value in the configuration comprises:
determining the quantity of the candidate frequency offsets P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

wherein ceiling represents an rounding up function.

9. The method according to claim 5, wherein the determining the candidate set of frequency offsets, based on the quantity of the candidate frequency offsets, the maximum quantity of positions of the SSB supportable by each offset value in the configuration and the predefined initial offset comprises:

determining a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB} * 2^{\mu}, \text{ if } \Delta_{SSB} \leq (N_{RMSI} * 2^{-\mu} - 20) \\ N_{RMSI} - 20 * 2^{\mu}, \text{ if } \Delta_{SSB} > (N_{RMSI} * 2^{-\mu} - 20) \end{cases};$$

wherein μ is a scaling factor between the SCS of the SSB and the SCS of the RMSI; $N_{RMSI}$ is the quantity of RBs in a granularity of RMSI RB in the RMSI CORESET bandwidth;

determining a value of an $i^{th}$ frequency offset $O_i$ in the candidate set of frequency offsets, based on the quantity of the candidate frequency offsets P, the frequency offset step size $\Delta_{RMSI}$ and the predefined initial offset $O_0$ and through the following formula:

$$O_i = O_0 + (i-1)*\Delta_{RMSI};$$

wherein $1 \leq i \leq P$;

wherein prior to the determining the value of the $i^{th}$ frequency offset $O_i$ in the candidate set of frequency offsets, based on the quantity of the candidate frequency offsets quantity P, the frequency offset step size $\Delta_{RMSI}$ and the predefined initial offset $O_0$, the method further comprises:

determining the initial offset $O_0$, based on the quantity $N_{RMSI}$ of RBs in the granularity of RMSI RB in the RMSI CORESET bandwidth, the quantity of the candidate frequency offsets P and the frequency offset step size $\Delta_{RMSI}$ and the rule of aligning the SSB with the center of the RMSI CORESET;

wherein the determining the initial offset $O_0$, based on the quantity $N_{RMSI}$ of RBs in the granularity of RMSI RB in the RMSI CORESET bandwidth, the quantity of the candidate frequency offsets P and the frequency offset step size $\Delta_{RMSI}$ and the rule of aligning the SSB with the center of the RMSI CORESET comprises:

determining the initial offset $O_0$, based on the quantity $N_{RMSI}$ of RBs in the granularity of RMSI RB in the RMSI CORESET bandwidth, the quantity of the candidate frequency offsets P and the frequency offset step size $\Delta_{RMSI}$ and the rule of aligning the SSB with the center of the RMSI CORESET and through the following formula:

$$O_0 = \text{floor}\left(\frac{N_{RMSI} - 20*2^{\mu} - (P-1)\Delta_{RMSI}}{2}\right).$$

10. A system information configuration device, comprising a transceiver, a memory, a processor and a computer program stored in the memory and executable on the processor;

the processor is configured to read a program in the memory to:

determine, based on a target parameter which is predetermined, a frequency offset configuration parameter of a Remaining Minimum System Information (RMSI) Control Resource Set (CORESET) with respect to a System Synchronization Block (SSB), wherein the target parameter comprises one or more of a channel bandwidth parameter, a Subcarrier Spacing (SCS) parameter of RMSI, an SCS parameter of SSB, a System Synchronization (SS) Raster parameter, and a RMSI CORESET bandwidth parameter; and perform a frequency offset configuration of the RMSI CORESET with respect to the SSB according to the frequency offset configuration parameter;

wherein the frequency offset configuration parameter comprises a quantity of candidate frequency offsets and frequency offsets in the candidate frequency offsets;

the processor is configured to read the program in the memory to:

determine the quantity of the candidate frequency offsets quantity and the frequency offsets in the candidate frequency offsets based on the target parameter which is predetermined and a predetermined rule;

wherein the predetermined rule comprises one or more of a rule of minimizing all possible quantities of candidate frequency offset positions within one SS Raster interval and a rule of aligning the SSB with a center of the RMSI CORESET.

11. The device according to claim 10, wherein the processor is configured to read the program in the memory to:

determine, based on the target parameters corresponding to carrier frequency bands in different frequency ranges, the frequency offset configuration parameters of the carrier frequency bands in different frequency ranges;

perform the frequency offset configuration of the RMSI CORESET with respect to the SSB for the carrier frequency bands in different frequency ranges based on the frequency offset configuration parameters of the carrier frequency bands in different frequency ranges, to obtain frequency offset configuration tables corresponding to the carrier frequency bands in different frequency ranges.

12. The device according to claim 10, wherein the processor is configured to read the program in the memory to:

determine the frequency offset configuration parameters of the carrier frequency bands in different frequency ranges, based on the target parameters corresponding to the carrier frequency bands in different frequency ranges under conditions of SS Raster definitions in different carrier frequency bands, different combinations of RMSI SCS and SSB SCS and different minimum channel bandwidths.

13. The device according to claim 12, wherein the carrier frequency bands in different frequency ranges comprise a carrier frequency band in the frequency range of 0 to 2.65 GHz and/or a carrier frequency band in the frequency range of 2.4 GHz to 6 GHz;

a minimum channel bandwidth of the carrier frequency band in the frequency range of 0 to 2.65 GHz comprises 5 MHz, 10 MHz and/or 20 MHz;

a minimum channel bandwidth of the carrier frequency band in the frequency range of 2.4 GHz to 6 GHz comprises 10 MHz, 20 MHz, and/or 40 MHz;

wherein the minimum channel bandwidth of the carrier frequency band in the frequency range of 0 to 2.65 GHz comprises 5 MHz and 10 MHz, and the same frequency offset configuration table at the minimum channel bandwidths of 5 MHz and 10 MHz is used for the carrier frequency bands in the frequency range of 0 to 2.65 GHz.

14. The device according to claim 10, wherein the channel bandwidth parameter comprises a quantity of Resource Blocks (RBs) within a channel bandwidth, the RMSI CORESET bandwidth parameter comprises a quantity of RBs within a RMSI CORESET bandwidth, and the SS Raster parameter comprises an SS Raster interval;

the processor is configured to read the program in the memory to:

determine, based on the quantity of RBs within the channel bandwidth and the quantity of RBs within the RMSI CORESET bandwidth, a maximum quantity of positions of the SSB supportable by each offset value in a configuration;

determine, based on the SS Raster interval and a maximum quantity of RB positions possible for placing SS Rasters in the channel bandwidth and according to the rule of minimizing all possible quantities of candidate frequency offset positions within one SS Raster interval, a maximum quantity of candidate RB positions possible for placing the SS Rasters in the channel bandwidth;

determine the quantity of the candidate frequency offsets, based on the maximum quantity of RB positions possible for placing SS Rasters in the channel bandwidth and the maximum quantity of positions of the SSB supportable by each offset value in the configuration; and determine a candidate set of frequency offsets, based on the quantity of the candidate frequency offsets, the maximum quantity of positions of the SSB supportable by each offset value in the configuration and a predefined initial offset.

15. The device according to claim 14, wherein the processor is configured to read the program in the memory to:

determine the maximum quantity of positions $\Delta_{SSB}$ of the SSB supportable by each offset value in the configuration, based on the quantity $N_{BW}$ of RBs in a granularity of RMSI RB within the channel bandwidth and the quantity $N_{RMSI}$ of RBs in a granularity of RMSI RB within the RMSI CORESET bandwidth and through the following formula:

$\Delta_{SSB}=\text{floor}([(N_{BW}-N_{RMSI})+1]*2^{-\mu})$;

wherein μ is a scaling factor between the SCS of the SSB and the SCS of the RMSI, and floor represents a rounding down function.

16. The device according to claim 14, wherein the processor is configured to read the program in the memory to:

determine the maximum quantity N' of RB positions possible for placing the SS Rasters in the channel bandwidth, based on the quantity $N_{SSB}$ of RBs in a granularity of SSB RB within the channel bandwidth and through the following formula:

$N'=N_{SSB}-19$;

determine the maximum quantity N of candidate RB positions possible for placing the SS Rasters in the channel bandwidth, based on the SS Raster interval $N_{Sync}$ in a granularity of SSB RB and N' through the following formula:

$N=\min(N_{Sync},N')$;

wherein min represents a minimum value finding function.

17. The device according to claim 14, wherein the processor is configured to read the program in the memory to:

determine the quantity of the candidate frequency offsets P, based on the maximum quantity N of RB positions possible for placing SS Rasters in the channel bandwidth and the maximum quantity of positions $\Delta_{SSB}$ of the SSB supportable by each offset value in the configuration and through the following formula:

$$P = \text{ceiling}\left(\frac{N}{\Delta_{SSB}}\right);$$

wherein ceiling represents an rounding up function.

18. The device according to claim 14, wherein the processor is configured to read the program in the memory to:

determine a frequency offset step size $\Delta_{RMSI}$ based on the maximum quantity of positions $\Delta_{SSB}$ of the SSB supportable by each offset value in the configuration and through the following formula:

$$\Delta_{RMSI} = \begin{cases} \Delta_{SSB}*2^{\mu}, & \text{if } \Delta_{SSB} \leq (N_{RMSI}*2^{-\mu}-20) \\ N_{RMSI}-20*2^{\mu}, & \text{if } \Delta_{SSB} > (N_{RMSI}*2^{-\mu}-20) \end{cases};$$

wherein μ is a scaling factor between the SCS of the SSB and the SCS of the RMSI; $N_{Sync}$ is the quantity of RBs in a granularity of RMSI RB in the RMSI CORESET bandwidth;

determine a value of an $i^{th}$ frequency offset $O_i$ in the candidate set of frequency offsets, based on the quantity of the candidate frequency offsets P, the frequency offset step size $\Delta_{RMSI}$ and the predefined initial offset $O_0$ and through the following formula:

$O_i=O_0+(i-1)*\Delta_{RMSI}$;

wherein $1 \leq i \leq P$;

wherein the processor is configured to read the program in the memory to:

determine the initial offset $O_0$, based on the quantity $N_{RMSI}$ of RBs in the granularity of RMSI RB in the RMSI CORESET bandwidth, the quantity of the candidate frequency offsets quantity P and the frequency offset step size $\Delta_{RMSI}$ and the rule of aligning the SSB with the center of the RMSI CORESET;

wherein the processor is configured to read the program in the memory to:

determine the initial offset $O_0$, based on the quantity $N_{RMSI}$ of RBS in the granularity of RMSI RB in the RMSI CORESET bandwidth, the quantity of the candidate frequency offsets P and the frequency offset step size $\Delta_{RMSI}$ and the rule of aligning the SSB with the center of the RMSI CORESET and through the following formula:

$$O_0 = \text{floor}\left(\frac{N_{RMSI}-20*2^{\mu}-(P-1)\Delta_{RMSI}}{2}\right).$$

* * * * *